(12) United States Patent
Iwamura et al.

(10) Patent No.: US 8,055,900 B2
(45) Date of Patent: Nov. 8, 2011

(54) INFORMATION PROCESSING APPARATUS, INFORMATION PROCESSING SYSTEM, INFORMATION PROCESSING METHOD, STORAGE MEDIUM AND PROGRAM

(75) Inventors: Keiichi Iwamura, Kanagawa (JP); Tomochika Murakami, Kanagawa (JP); Satoru Wakao, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1180 days.

(21) Appl. No.: 11/550,919

(22) Filed: Oct. 19, 2006

(65) Prior Publication Data
US 2007/0063884 A1     Mar. 22, 2007

Related U.S. Application Data

(62) Division of application No. 10/366,313, filed on Feb. 14, 2003, now Pat. No. 7,194,630.

(30) Foreign Application Priority Data

Feb. 27, 2002 (JP) .................................. 2002-051825
Apr. 5, 2002 (JP) .................................. 2002-104068

(51) Int. Cl.
*G06F 11/08* (2006.01)
(52) U.S. Cl. .......... 713/176; 380/28; 380/217; 380/269; 348/14.13
(58) Field of Classification Search .................. 713/176; 380/30; 382/100
See application file for complete search history.

(56) References Cited

U.S. PATENT DOCUMENTS

| | | | |
|---|---|---|---|
| 5,005,200 A | 4/1991 | Fischer | |
| 5,499,294 A | 3/1996 | Friedman | 380/10 |
| 5,600,720 A | 2/1997 | Iwamura et al. | 380/1 |
| 5,625,693 A | 4/1997 | Rohatgi et al. | 380/23 |
| 5,666,419 A | 9/1997 | Yamamoto et al. | 380/28 |
| 5,745,686 A | 4/1998 | Saito et al. | |
| 5,875,249 A | 2/1999 | Mintzer et al. | 380/54 |
| 5,915,024 A | 6/1999 | Kitaori et al. | |
| 5,937,395 A | 8/1999 | Iwamura | 705/30 |
| 6,064,764 A | 5/2000 | Bhaskaran et al. | 382/183 |
| 6,088,454 A | 7/2000 | Nagashima et al. | 380/49 |
| 6,425,081 B1 | 7/2002 | Iwamura | 713/176 |
| 6,463,535 B1 | 10/2002 | Drews | 713/176 |
| 6,560,339 B1 | 5/2003 | Iwamura | 380/201 |

(Continued)

FOREIGN PATENT DOCUMENTS

EP     0 982 927 A1     3/2000

(Continued)

*Primary Examiner* — Taghi Arani
*Assistant Examiner* — Amir Mehrmanesh
(74) *Attorney, Agent, or Firm* — Fitzpatrick, Cella, Harper & Scinto

(57) ABSTRACT

A provider side apparatus provides original digital data together with a digital signature generated by the provider side apparatus, the digital signature detecting whether the original digital data was falsified or detecting a change level given to the original digital data. Upon reception of the digital data, a receiver side apparatus can know the originality of the received digital data or a change level of the received digital data from the original digital data, in accordance with the digital signature corresponding to the digital data.

3 Claims, 17 Drawing Sheets

U.S. PATENT DOCUMENTS

| | | |
|---|---|---|
| 6,611,599 B2 | 8/2003 | Natarajan ..................... 380/203 |
| 6,748,533 B1 | 6/2004 | Wu et al. ....................... 713/176 |
| 6,944,314 B2 | 9/2005 | Shimada |
| 7,092,448 B2 * | 8/2006 | Turaga et al. ............ 375/240.26 |
| 7,394,573 B1 * | 7/2008 | Goldberg et al. ............ 358/3.28 |
| 2001/0012019 A1 | 8/2001 | Yamazaki et al. ............ 345/639 |
| 2001/0017709 A1 | 8/2001 | Murakami et al. ........... 358/1.14 |
| 2001/0017717 A1 | 8/2001 | Ishida et al. .................. 358/464 |
| 2001/0046307 A1 | 11/2001 | Wong ............................ 382/100 |
| 2001/0053238 A1 * | 12/2001 | Katsura et al. ................ 382/100 |
| 2001/0054145 A1 | 12/2001 | Shimada |
| 2001/0055390 A1 | 12/2001 | Hayashi et al. ............... 380/220 |
| 2002/0002679 A1 | 1/2002 | Murakami et al. ............ 713/176 |
| 2002/0016916 A1 | 2/2002 | Natarajan ..................... 713/179 |
| 2002/0021808 A1 | 2/2002 | Iwamura |
| 2002/0023216 A1 | 2/2002 | Noguchi et al. .............. 713/171 |
| 2002/0060736 A1 | 5/2002 | Wakao et al. ................. 348/207 |
| 2002/0095577 A1 | 7/2002 | Nakamura et al. |
| 2002/0104003 A1 | 8/2002 | Iwamura ....................... 713/176 |
| 2002/0133705 A1 | 9/2002 | Tagashira et al. ............. 713/176 |
| 2002/0165823 A1 | 11/2002 | Iwamura ......................... 705/41 |
| 2003/0012406 A1 | 1/2003 | Iwamura ....................... 382/100 |
| 2003/0112333 A1 * | 6/2003 | Chen et al. .................... 348/192 |
| 2007/0098214 A1 | 5/2007 | Iwamura |

FOREIGN PATENT DOCUMENTS

| | | |
|---|---|---|
| JP | 2-291043 | 11/1990 |
| JP | 9-54735 | 2/1997 |
| JP | 10-003257 | 1/1998 |
| JP | 11-327438 | 11/1999 |
| JP | 2001-358935 | 12/2001 |
| JP | 2002-57883 | 2/2002 |
| JP | 2002-91465 | 3/2002 |

* cited by examiner

FIG. 20
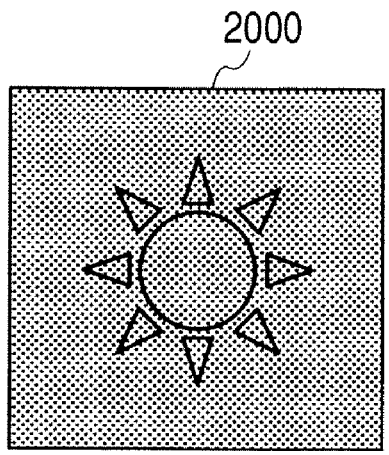
2000
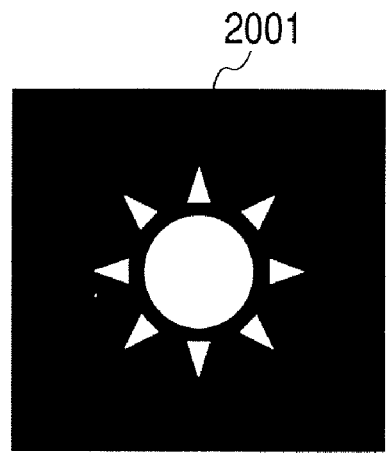
2001
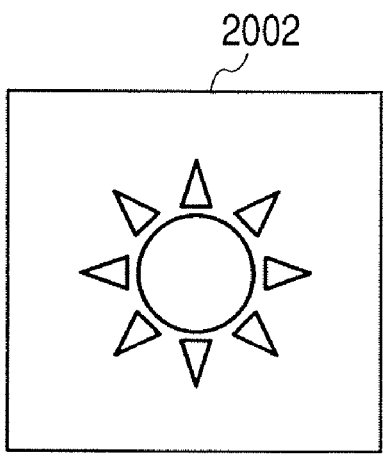
2002
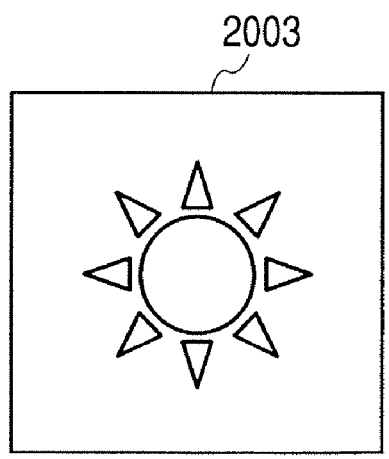
2003
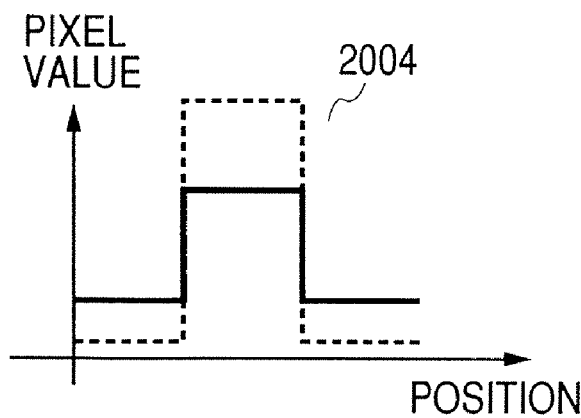
PIXEL VALUE
2004
POSITION
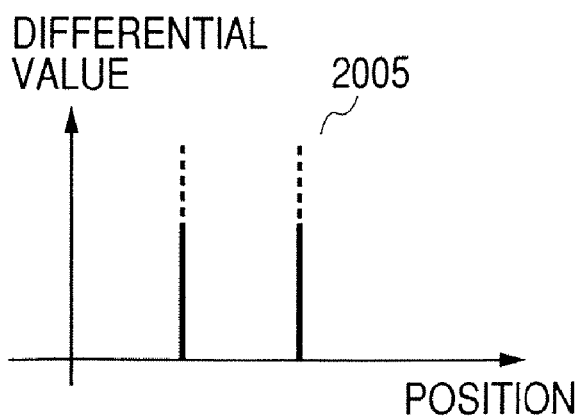
DIFFERENTIAL VALUE
2005
POSITION

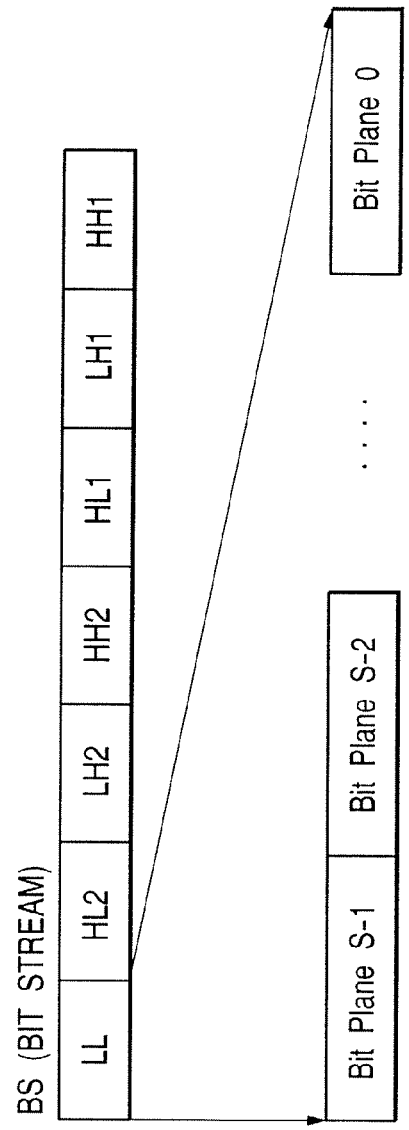

INFORMATION PROCESSING APPARATUS, INFORMATION PROCESSING SYSTEM, INFORMATION PROCESSING METHOD, STORAGE MEDIUM AND PROGRAM

This application is a division of application Ser. No. 10/366,313, filed Feb. 14, 2003.

BACKGROUND OF THE INVENTION

1. Field of the Invention

The present invention relates to an information processing apparatus, an information processing system, an information processing method, a computer readable storage medium storing a program for realizing the information processing method, and the program, all of which are used with the apparatus or system for detecting falsification of digital data in accordance with a human sense, the digital data including, for example, image data containing moving images and still images and voice data such as music.

2. Description of the Related Art

"Digital data" is intended to mean digitalized information, and "digital contents" are intended to mean the contents or meaning of digital data of a still image such as photographs, a moving image such as movie, or voices such as music.

Digital data is easy to be subjected to processes such as editing and compression processes. It is therefore easy to falsify digital data. It is an important issue to detect the presence/absence of falsification of digital data in order to protect its copyright.

There is a method of guaranteeing the originality of digital data by calculating a hash value of the digital data and executing a digital signature by using public key cryptography. For example, in the system disclosed in U.S. Pat. No. 5,499,294, a transmission side of digital data has a secret key Ks and a public key Kp. The transmission side of the digital data executes a calculation process of compressing plaintext data M by a hash function and outputting an output h having a predetermined length.

The hash function has a function of outputting data h having a predetermined length by calculating plaintext data M having an arbitrary length. The output data h is called a hash value of plaintext data M.

The hash function is a one-way function having a difficulty, in terms of calculation amount, in calculating plaintext data M satisfying "h=H(M)" from a given output data h. The hash function also has the collision tolerance that it is difficult in terms of calculation amount to calculate plaintext data M' satisfying "H(M)=H(M')" (M is not equal to M') and it is difficult in terms of calculation amount to calculate plain text data M and M' satisfying "H(M)=H(M') and M is not equal to M')".

Known hash functions include MD-2, MD-4, MD-5, SHA-1, RIPEMD-128, RIPEMD-160 and the like. The algorithms of these functions are made public.

Next, the transmission side of the digital data executes a calculation process of converting the output h by using the secret key Ks and outputting the conversion result as a digital signature s, namely by using an equation of D(Ks, h)=s.

The transmission side transmits the digital signature s and plaintext data M to the reception side of the digital data.

The reception side of the digital data executes: a calculation process of converting the digital signature s transmitted from the transmission side by using the public key Kp, namely by using the equation E(Kp, s)=E(Kp, D(Ks, h"))=h"; and a calculation process of calculating h' by compressing the plaintext data M' transmitted from the transmission side of the digital data by using the same hash function used by the transmission side. The reception side of the digital data judges that the plaintext data M' is correct if h' and h" are coincident.

If the plaintext data M transmitted from the transmission side of the digital data is altered or falsified before the plaintext data M is received at the reception side of the digital data, E(Kp, s)=E(Kp, D(Ks, h"))=h" is not coincident with h' obtained by compressing the plaintext data M' by the hash function so that it is possible to detect falsification of the plaintext data M.

Since the hash function is a one-way function, if the plaintext data M is falsified, the digital signature s is also falsified. Therefore, there is no possibility of an inability to detect falsification of the plaintext data M.

With this method, falsification can be detected. For example, if original digital image data is inserted with other image contents, if original digital image data is partially deleted, or if original digital image data is compressed, the altered digital image data is different from the original digital image data even by one bit.

For example, if digital image data transmitted from a transmission side is compressed by a JPEG compression method and developed, the digital image data becomes quite different from the original digital image data. However, the human sense recognizes it as the same image contents. If digital image data transmitted from a transmission side is superposed with noises such as an electronic watermark unable to be distinguished with human eyes, the digital image data becomes quite different from the original digital image data. However, the human sense recognizes it as the same image contents.

The reason for this may be ascribed to that a high level of redundancy generally exists in image contents. From this reason, the reception side of digital image data recognizes falsification even if the alteration process unable to detect with human sense is performed, i.e., even if the alteration process is performed which does not essentially change the contents of the digital image data.

SUMMARY OF THE INVENTION

According to one embodiment, it is an object of the invention to provide an information processing apparatus, an information processing system, an information processing method, a computer readable storage medium storing a program for realizing the information processing method, and the program, all of which can detect falsification of digital contents in accordance with a human sense.

It is another object of the invention to provide an information processing apparatus, an information processing system, an information processing method, a computer readable storage medium storing a program for realizing the information processing method, and the program, all of which can detect a falsification level of digital contents from the original digital contents.

Other features and advantages of the present invention will become apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 20 is a diagram illustrating a process of a characteristic value calculating means.

FIGS. 22A, 22B, 22C and 22D are schematic diagrams showing the structure of a code train without space scalable/ROI of JPEG2000.

DESCRIPTION OF THE PREFERRED EMBODIMENTS

Embodiments of the invention will be described with reference to the accompanying drawings.

First Embodiment

Figure 1:
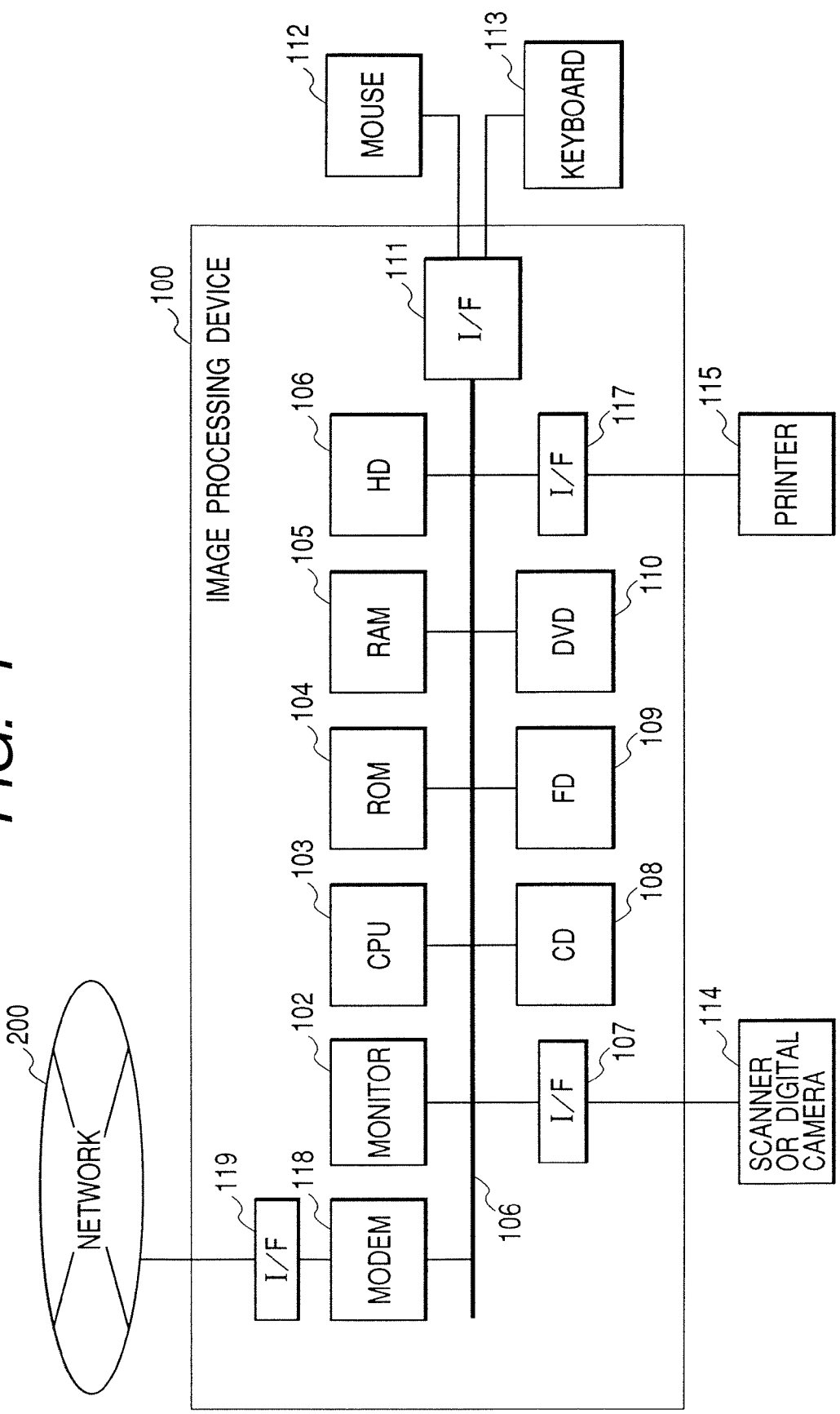
FIG. 1 is a block diagram showing the structure of an image processing apparatus of the invention.

The invention is applied, for example, to an image processing apparatus 100 such as shown in FIG. 1.

The image processing apparatus 100 of the embodiment serves as a transmission side apparatus which transmits digital image data representative of image contents such as moving images and still images, together with predetermined information such as a digital signature, to an external apparatus. Alternatively the image processing apparatus 100 serves as a reception side apparatus which receives digital image data transmitted from an external apparatus and detects a level of falsification or alteration of the digital image data.

<Structure of the Image Processing Apparatus 100>

The structure of the image processing apparatus (device) 100 of the invention will be described with reference to FIG. 1.

The image processing apparatus 100 is constituted of an information processing apparatus such as a personal computer. As shown in FIG. 1, the image processing apparatus 100 has an interface (I/F) 119 with a network such as the Internet, public telephone line and LAN, a modem 118, a monitor 102, a central processing unit (CPU) 103, a read only memory (ROM) 104, a random access memory (RAM) 105, a hard disk (HD) 106, a pointing device 112, a keyboard 113, an interface (I/F) 111 for the pointing device and keyboard, a printer 115, an interface (I/F) 117 for the printer, a digital versatile disk (DVD) drive 110, a floppy disk (FD) drive 109, a compact disk (CD) drive 108, an input machine 114 such as a scanner and a digital camera and an interface (I/F) 107 for the input machine, respectively connected by a system bus 116 for allowing communications therebetween.

The image processing apparatus 100 can, for example, input digital image data from the input machine 114 via I/F 107, display the digital image data on the monitor 102, edit the digital image data by operating the pointing device 112 or keyboard 113 via I/F 111, store the digital image data in ROM 104, or print out the digital image data on the printer 115.

The monitor 102 may be a cathode ray tube (CRT), a liquid crystal display, a plasma display or the like.

CPU 103 executes various process programs to control the whole operation of the image processing apparatus.

ROM 104 stores information on specific digital image data prohibited to print out, image processing programs, various data and the like.

RAM 105 temporarily stores process programs, data to be processed and the like necessary for the control process to be executed by CPU 103.

HD 106 stores in advance process programs, various data and the like to be transferred to RAM 105 or the like, and stores various processed data and the like.

I/F 107 inputs digital image data from the input machine 114 to the image processing apparatus 100. The input machine 114 reads, for example, an original, a film or the like with a charge coupled device (CCD) and generates digital image data.

The generated digital image data is stored in RAM 105 via I/F 107 or the system bus 116, or stored in a RAM (not shown) of an external computer via the network 200. The input machine 114 may be a digital camera, a scanner or the like.

If the input machine 114 is a microphone, it is possible to input voice signals and generate digital voice data.

In the following, digital image data of still images will be described illustratively. The embodiment is also applicable to moving images and voices.

The CD drive 108 reads various data recorded in a CD-R which is one type of an external storage medium, and writes various data in a CD-R.

The FD drive 109 reads various data recorded in an FD and writes various data in an FD.

The DVD drive 110 reads various data recorded in a DVD and writes various data in a DVD.

If the external storage medium such as CD, FD and DVD stores image editing programs or printer driver programs, CPU 103 reads various programs from the external storage medium and writes them in HD 106, when necessary, transfers them to RAM 105, and thereafter executes necessary various programs read from RAM 105. In this manner, images of digital image data can be edited and can be printed out from the printer.

I/F 111 receives various input instructions from the pointing device 112 and keyboard 113.

The modem 118 is connected to the external network 200 via I/F 119.

<Operation of the Image Processing Apparatus 100 Functioning as a Transmission Side Apparatus for Digital Image Data>

The operation of the image processing apparatus 100 functioning as the transmission side apparatus for digital image data will be described with reference to the flow chart shown in FIG. 2.

Step S201:

Digital image data is input to the image processing apparatus 100 via each I/F from the external storage medium such as CD-ROM and DVD, the input machine 114, or an apparatus on the network 200.

CPU 103 stores the input digital image data in RAM 105.

Step S202:

In accordance with an instruction entered by an operator by operating the keyboard 113 or pointing device 112, CPU 103 reads from HD 106 the image editing program for executing a change process for the digital image data, stores it in RAM 105, and thereafter executes the program read from RAM 105.

The change process for digital image data includes image editing processes. For example, if the digital image data is still image data, the image editing processes are a JPEG compression process, a cut-out process for a desired image area, an magnification and reduction process for various image sizes, a tonal level conversion process relative to various conversion coefficients, an image projection conversion process, a frequency conversion process and the like. A commercially sold program may be available for the image editing program.

Step S203:

CPU 103 displays digital image data changed by various change processes at Step S202 on the monitor 102 or prints out it from the printer 115 to thereby allow the operator to visually confirm the changed digital image data.

The operator is an entity such as an author who desires to detect any falsification of digital image data.

Step S204:

The operator judges whether the changed digital image data was falsified or not, and inputs the judgement result to the image processing apparatus 100 by operating the pointing device 112 or keyboard 113.

CPU 103 of the image processing apparatus 100 judges whether the judgement result entered via I/F 111 is a presence or absence of falsification.

If it is judged that no falsification exists, the process at Step S205 is executed, whereas if it is judged that falsification exists, the subject process is terminated.

Step S205:

CPU 103 executes a process of generating a digital signature of the changed digital image data.

Digital data is constituted of a plurality of bit planes starting from the least significant bit (LSB) to the most significant bit (MSB). Generally, if digital data is subjected to various changes, bits nearer to LSB are likely to be changed and bits nearer to MSB are not likely to be changed.

At Step S205 of the embodiment, the digital image data and the changed digital image data are compared sequentially from the bit plane near at MSB, and the hash values of the hash function are calculated for the bit planes having the same value, and encrypted by using the secret key Ks to generate digital signatures. In this manner, if the digital image data is subjected to a small change process, the digital signature is generated which contains the value of the bit plane near to LSB, whereas if the digital image data is subjected to a larger change process, a digital signature is, generated which contains the value of the bit plane near to MSB.

The digital signature is not generated for the bit plane subjected to the change process judged as falsification. Namely, the digital signature is not generated for those bit planes after a specified bit plane.

CPU 103 stores the generated digital signature in an external storage medium or a storage device such as ROM and executes again the process starting from Step S202.

CPU 103 adds the generated digital signature to the digital image data, and stores it in an external such as the external storage medium including CD-ROM, DVD or the like, or in the input machine 114, or outputs it to an external via the network 200.

The process at Steps S202 to S205 is repetitively executed each time the change process is executed for original digital image data at Step S202 or for each parameter of the change process for the original digital image data. If it is judged at Step S204 that the change process for digital contents corresponds to falsification, the digital signature is not generated for the changed digital image data to thereafter terminate the subject process.

All digital contents subjected to the change process whose change is larger than that of the change process judged as falsification at Step S204 are considered as falsification.

In this embodiment, a method of generating a digital signature for detecting falsification by utilizing the nature of a bit plane has been described. This embodiment is only illustrative and is not limited only thereto. For example, the lower frequency components of digital image data are likely to be changed, whereas the higher frequency components are not likely to be changed. In this case, digital data is frequency-converted sequentially from the high frequency components toward the low frequency components to generate digital signatures until it is judged as falsification.

<Operation of the Image Processing Apparatus 100 Functioning as the Reception Side for Digital Image Data>

Figure 3:
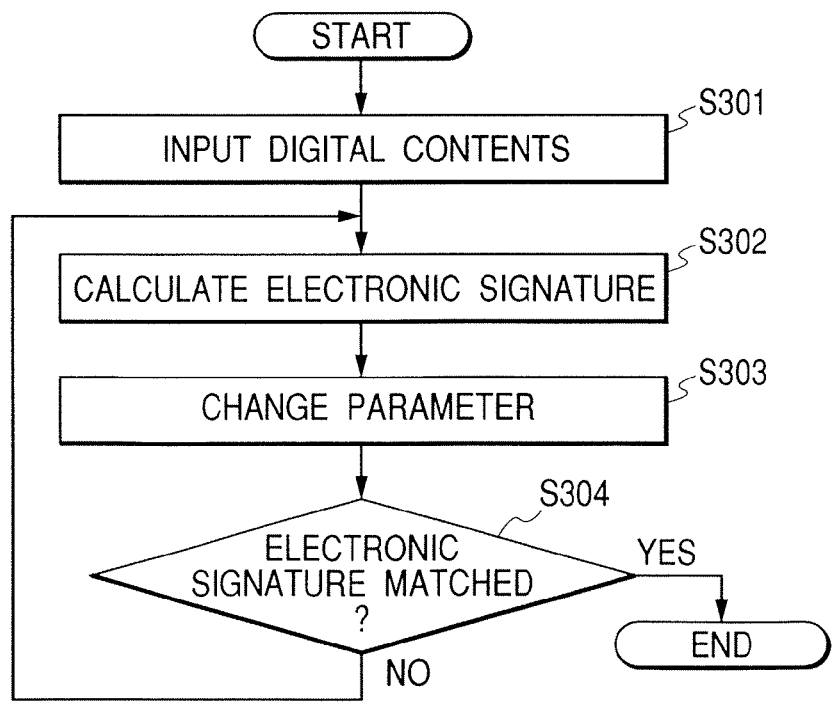
FIG. 3 is a flow chart illustrating the operation of the image processing apparats of the invention functioning as a reception side of digital data.

FIG. 3 is a flow chart illustrating the operation of the image processing apparatus 100 functioning as the reception side for digital image data.

Step S301:

The image processing apparatus 100 receives digital image data added with a digital signature via I/F 119. CPU 103 temporarily stores the received digital image data in RAM 105.

Step S302:

CPU 103 calculates the digital signature of a bit plane of the digital image data stored at Step S301 in accordance with a digital signature calculation procedure. For example, if a method of detecting falsification from a difference between bit planes is incorporated, a digital signature is generated by omitting the bit planes nearer to LSB of digital image data.

Step S303:

CPU 103 changes each bit plane so as to generate a digital signature by sequentially omitting the bit plane from LSB toward MSB.

Step S304:

CPU 103 compares the digital signature calculated at Step S302 with the digital signature stored at Step S301. If the digital signature coincident with the digital signature calculated at Step S302 exists in the digital signatures stored at Step S301, it is judged that the digital image data is not falsified. The change level of digital image data can be judged from the number of coincident digital signatures.

That is, even if there is no coincidence of digital signatures of all bit planes including LSB, if the digital signatures from a specific bit plane are coincident, it can be recognized that the digital image data was changed to that level.

Figure 2:
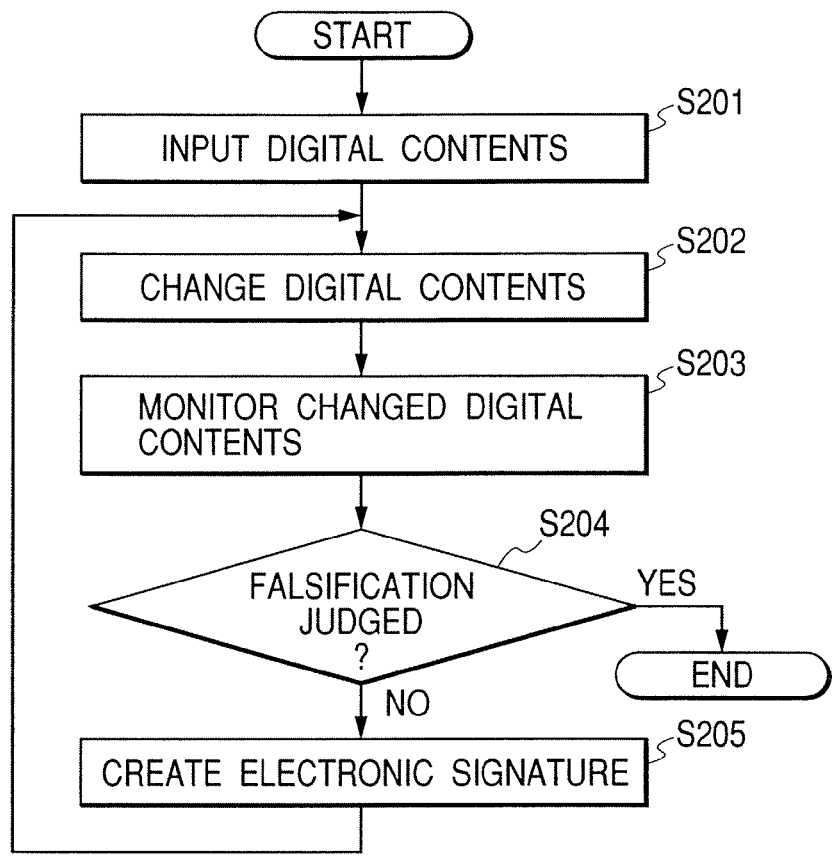
FIG. 2 is a flow chart illustrating the operation of the image processing apparats of the invention functioning as a transmission side of digital data.

In this embodiment, the transmission side for digital image data generates at Step S205 shown in FIG. 2 a plurality of digital signatures for those bit planes not judged as falsification. The embodiment is not limited only thereto. For example, only the digital signatures may be generated for the bit planes in the range immediately before the judgement as falsification. In this case, at Step S204 shown in FIG. 3 the reception side can check falsification although the change level of digital image data cannot be judged.

Second Embodiment

In the second embodiment, the level of judging a change in original digital image data as falsification is recognized not manually by an operator but automatically.

Only the structure and operation different from the first embodiment will be described specifically.

As an approach to representing by an equation the degree of being judged as falsification by using a human sense, for example there are Signal to Notice Rate (SNR), Peak Signal to Notice Rate (PSNR), Perceptive Evaluation Level (PEL) and Just Noticeable Difference (JND). Program codes programmed to realize such an approach are stored to allow the image processing apparatus 100 to read and execute them. In this manner, the degree of falsification of digital image data can be judged automatically.

Figure 4:
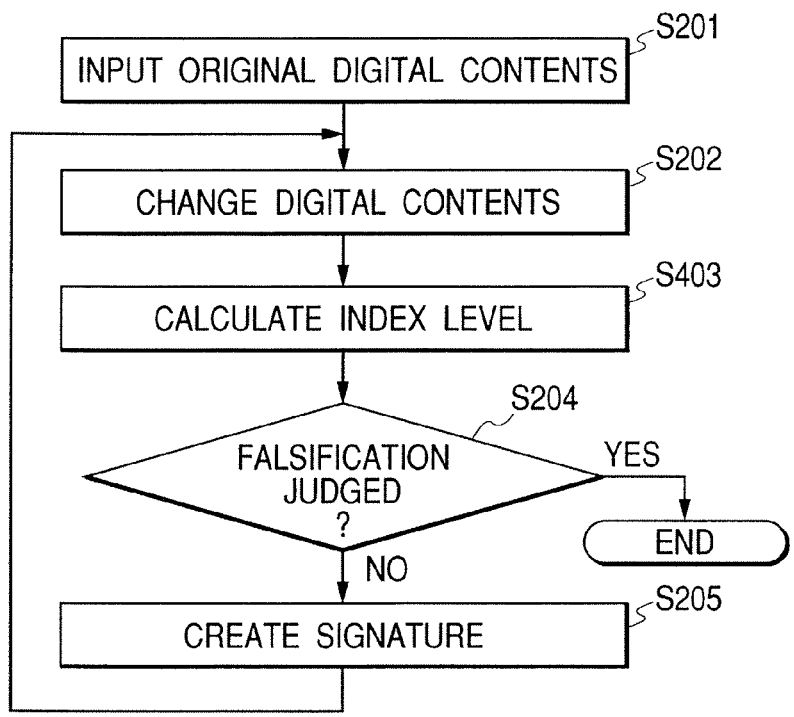
FIG. 4 is a flow chart illustrating the operation of the image processing apparats of the invention functioning as a transmission side of digital data.

The operation of the image processing apparatus 100 shown in FIG. 1 functioning as a transmission side will be described with reference to FIG. 4.

First, CPU 103 of the image processing apparatus 100 executes the process similar to Steps S201 and S202 shown in FIG. 2, and then reads the program for executing an automatic falsification judging approach from HD 106 and temporarily stores it in RAM 105. Thereafter, the program is read from RAM 105 and executed. CPU 103 calculates an index level for judging whether there is falsification of the digital image data (Step 403).

In this case, a threshold value of the index value for judging whether a change in the digital image data is falsification or not is given beforehand. At Step S204, CPU 103 compares the index value calculated at Step S403 with the threshold value to automatically judge the falsification level of the digital image data.

If it is judged at Step S204 that the change in the digital image data is not falsification, CPU 103 executes the process at Step S205 shown in FIG. 2.

Third Embodiment

In the third embodiment, falsification of digital image data is judged not by a digital signature but by an index value.

Only the structure and operation different from the first or second embodiment will be described specifically.

Figure 5:
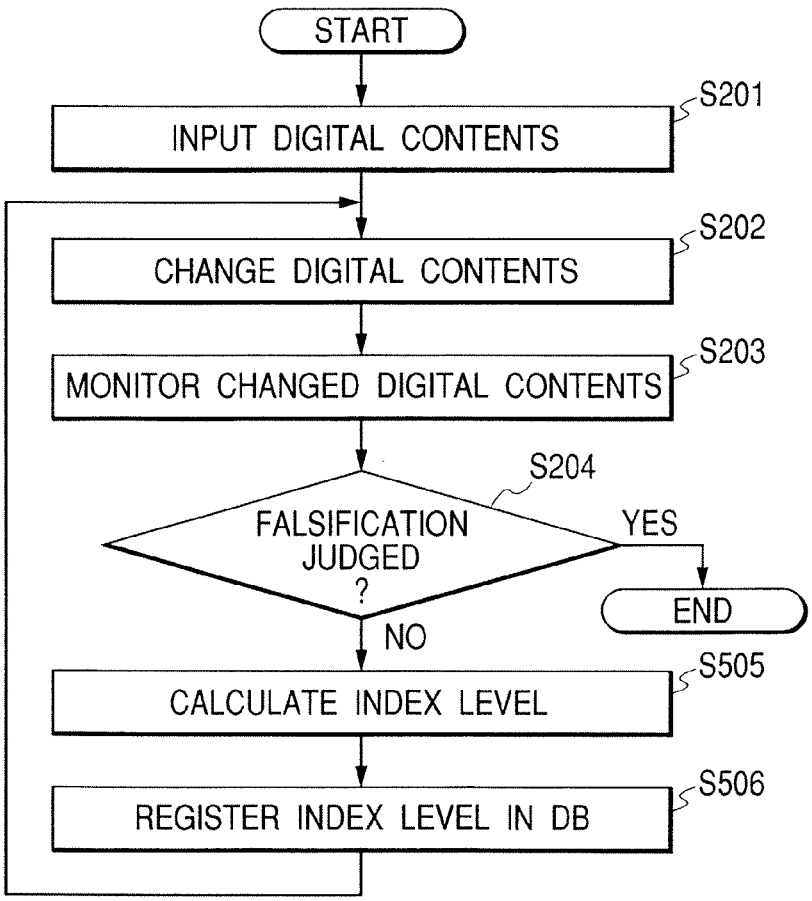
FIG. 5 is a flow chart illustrating the operation of the image processing apparats of the invention functioning as a transmission side of digital data.

The operation of the image processing apparatus 100 shown in FIG. 1 functioning as a transmission side will be described with reference to FIG. 5.

First, CPU 103 of the image processing apparatus 100 executes the process similar to Steps S201 to S204 shown in FIG. 2. If it is judged at Step S204 that there is no falsification, at Step S505 CPU 103 executes the program for automatically performing the approach to judging falsification of the digital image data to thereby calculate an index value.

At Step S506, CPU 103 registers the index value calculated at Step S505 in DB (not shown) (e.g., DB on the network 200) which cannot be accessed from the reception side for digital image data.

The process at Step S202 is again executed.

If it is judged at Step S204 that the digital image data is falsified, the subject process is terminated without the calculation and registration of the index value.

CPU 103 of the image processing apparatus 100 outputs externally the original digital image data to the external storage medium such as CD-ROM and DVD or to the input machine 114 or via the network 200.

Figure 6:
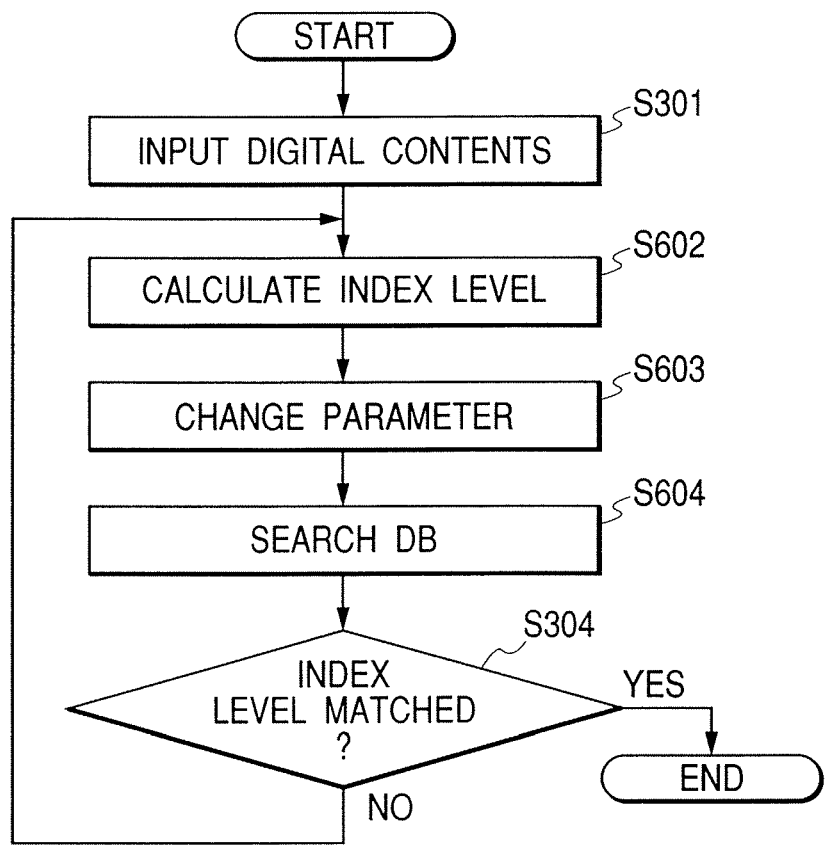
FIG. 6 is a flow chart illustrating the operation of the image processing apparats of the invention functioning as a reception side of digital data.

Next, the operation of the image processing apparatus 100 functioning as a transmission side for digital image data will be described with reference to FIG. 6.

First, similar to Step S301 shown in FIG. 3, the image processing apparatus 100 is supplied with digital contents. CPU 103 of the image processing apparatus 100 calculates the index value of the input digital image data by the process similar to Step S505 shown in FIG. 5 (Step S602).

Next, CPU 103 changes a parameter (e.g., a bit plane or frequency) used for calculating the index value at Step S602 (Step S603).

CPU 103 searches the value coincident with the index value calculated at Step S602 from index values stored in DB (Step S604).

At Step 304 if the value coincident with the index value calculated at Step S602 is not registered in DB, CPU 103 executes the process at Step S602 If the value is registered in DB, it is judged that the digital image data is not falsified, and the change level of the digital image data is determined from the index value stored in DB.

If the value coincident with the index value calculated at Step S602 does not coincide with all index values registered in DB, it is possible to recognize the change level of the digital image data.

Also in this embodiment, it is not necessary to store a plurality of index values in DB. For example, only an index value immediately before the recognition of falsification may be registered in DB, although it is not possible to detect the change level of digital image data.

Fourth Embodiment

Figure 7:
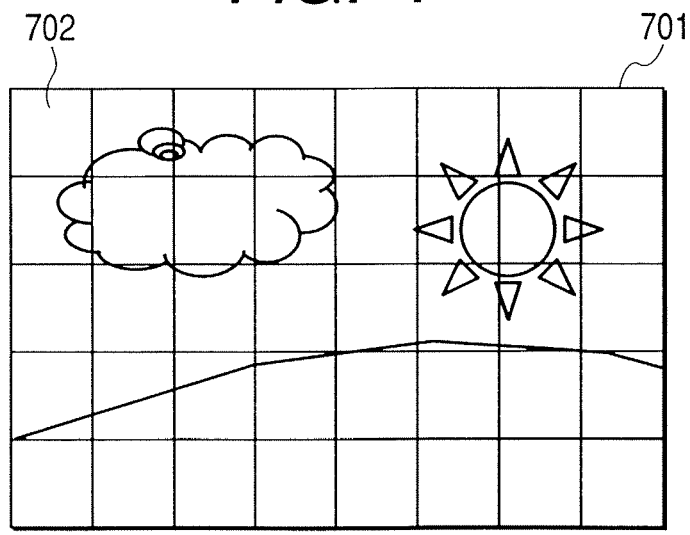
FIG. 7 is a diagram showing image data as an example of digital data.

The embodiment will be described by using image data 701 such as shown in FIG. 7 as an example of digital image data.

If the common-key cryptographic scheme is used, it is assumed that common data (secret key of the common-key cryptographic scheme) necessary for the verification of a digital signature can be distributed secretly to the verifier via the network.

A digital signature for detecting falsification is calculated for the image data 701. In this case, a digital signature may be calculated from the whole area of the image data 701 or it may be calculated for each block unit 702 of the image data.

In this embodiment, the description assumes that the image data is divided into block units 702 and a digital signature is calculated for each block unit. In this embodiment, it is obvious that the digital signature may be calculated from the whole area of the image data 701. If the digital signature is calculated for each block unit, it is advantageous in that a falsified area in the image data 701 can be identified.

Figure 9:
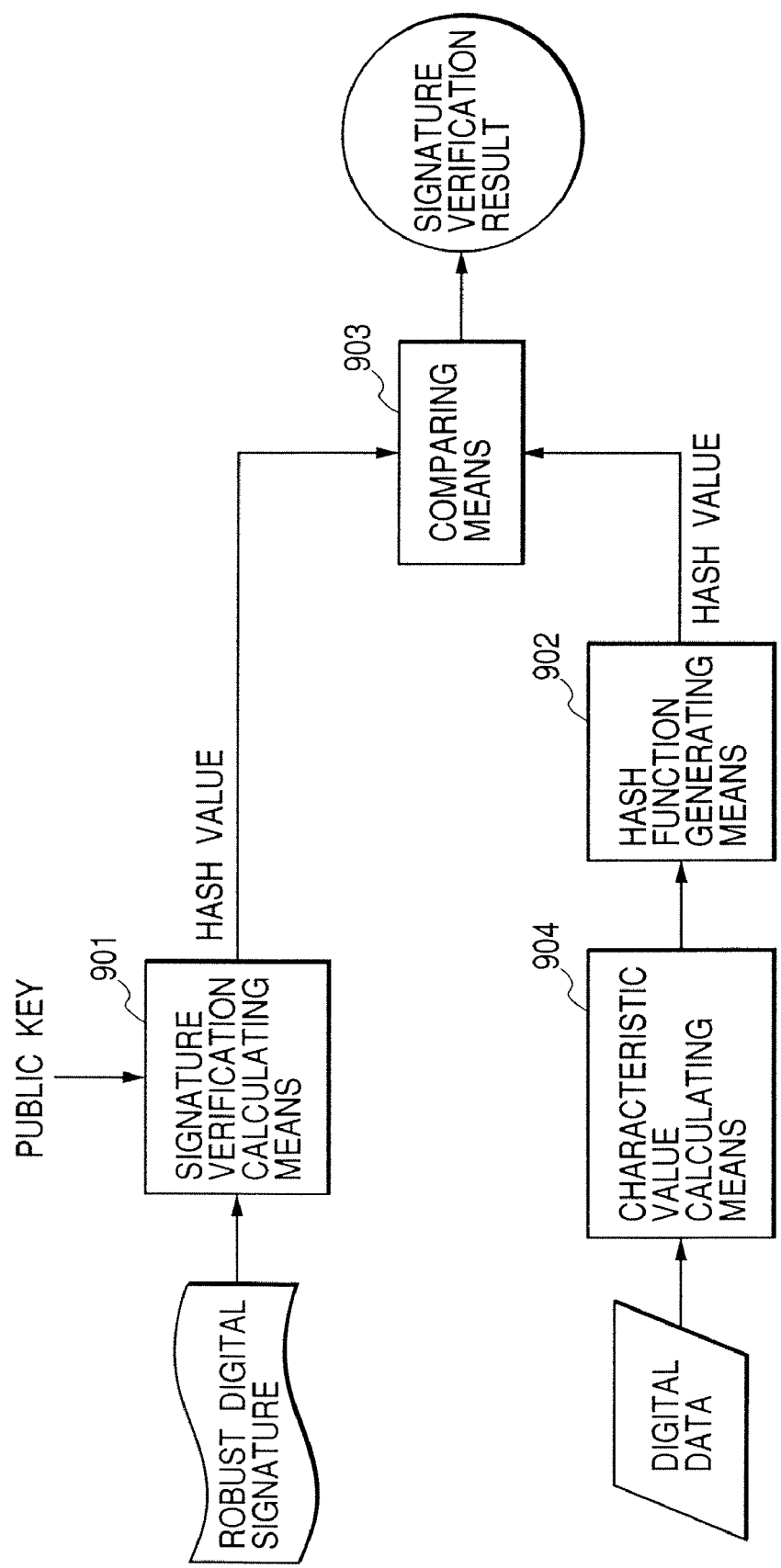
FIG. 9 is a block diagram illustrating the internal process of a digital signature verifying apparatus.

Referring to FIG. 9, a signature verification calculating means 901 executes a calculation process for robust digital signature data by using a public key if the public-key cryptographic scheme is utilized, to thereby recover a hash value, and sends it to a succeeding stage comparing means 903. If the common-key cryptographic scheme is utilized, the signature verification calculating means executes a calculation process for robust digital signature data by using common data (secret key) necessary for encryption and decryption to thereby recover a hash value, and sends it to the succeeding stage comparing means 903.

Figure 8:
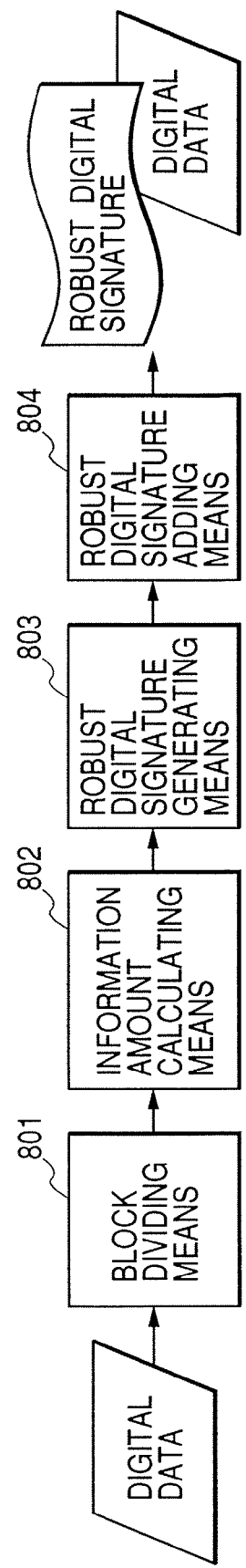
FIG. 8 is a block diagram illustrating the internal process of a digital signature adding apparatus.

FIG. 8 is a block diagram showing the internal structure of a robust digital signature adding apparatus for adding robust digital signatures to image data.

First, image data is input to a block dividing means 801. The block dividing means 801 divides the whole area of the image data shown in FIG. 7 into block units and outputs block unit image data to an information amount (characteristic value) calculating means 802. If a digital signature is not calculated for each block unit, the block dividing means 801 is not necessary.

When the block unit image data is input, the characteristic value calculating means 802 calculates a characteristic value. In this case, the characteristic value calculating means 802 generates a characteristic value which is stable and not changing (robust) so long as the expression contents of the block unit image data does not change greatly.

A characteristic value of each set of the block unit image data output from the characteristic value calculating means 802 is input to a robust digital signature adding means 803.

The robust digital signature generating means 803 generates a robust digital signature of the characteristic value of each set of input block unit image data, by using a hash function and a secret key if the public-key cryptographic scheme is utilized, or a hash function and common data (secret key) necessary for encryption and decryption if the common-key cryptographic scheme is utilized. In this embodiment, the digital signature generated in accordance with the characteristic value is specifically called a robust digital signature.

The robust digital signature generating means 803 outputs each robust digital signature to the robust digital signature adding means 803.

The process described above is repetitively performed for all sets of block unit image data.

The robust digital signature adding means 804 adds the robust digital signatures to a predetermined position of the image data. In this case, in order to identify the falsified block unit image data, the robust digital signal adding means 804 adds the robust digital signature to the predetermined position (comment column or signature column, a header or the like) of the image data, in correspondence with the position of the block unit image data in the whole area of the image data.

If necessary, information on a characteristic value calculation method and various parameters may be added to the predetermined position of the image data.

Next, a robust digital signature verifying apparatus will be described with reference to FIG. 9.

First, the robust digital signature verifying apparatus reads the robust digital signatures from the predetermined position of the image data, and inputs them to the signature verification calculating means 901.

The signature verification calculating means 901 executes a calculation process for the robust digital signature by using a public key if the public-key cryptographic scheme is utilized, to thereby recover a hash value, and sends it to the comparing means 903. If the common-key cryptographic scheme is utilized, the signature verification calculating means executes a calculation process for the robust digital signature by using common data (secret key) necessary for encryption and decryption to thereby recover a hash value, and sends it to the comparing means 903.

Next, the block unit image data at the predetermined position of the image data is read and input to a characteristic value calculating means 904.

The characteristic value calculating means 904 calculates a characteristic value of the input block unit image data and outputs it to a hash function generating means 902.

The hash function generating means 902 calculates a hash value of the input characteristic value by using a hash function and inputs it to the comparing means 903.

The comparing means 903 compares the hash value input from the signature verifying means 901 with the hash value input from the hash function generating means 902. If the two hash values are equal, a value (e.g., 1) representative of truth of the verification result is output, whereas if the two hash values are not equal, a value (e.g., 0) representative of false of the verification result is output.

Namely, the robust digital signature verifying apparatus shown in FIG. 9 outputs a verification result of originality of image data, if the characteristic value calculated by the characteristic value calculating means 904 is equal to the characteristic value calculated by the characteristic value calculating means 802 of the robust digital signature adding apparatus shown in FIG. 8.

Next, description will be given on a multi level robust digital signature adding apparatus and a multi level robust digital signature verifying apparatus capable of judging the falsification level of image data or the confidentiality level of originality.

Figure 10:
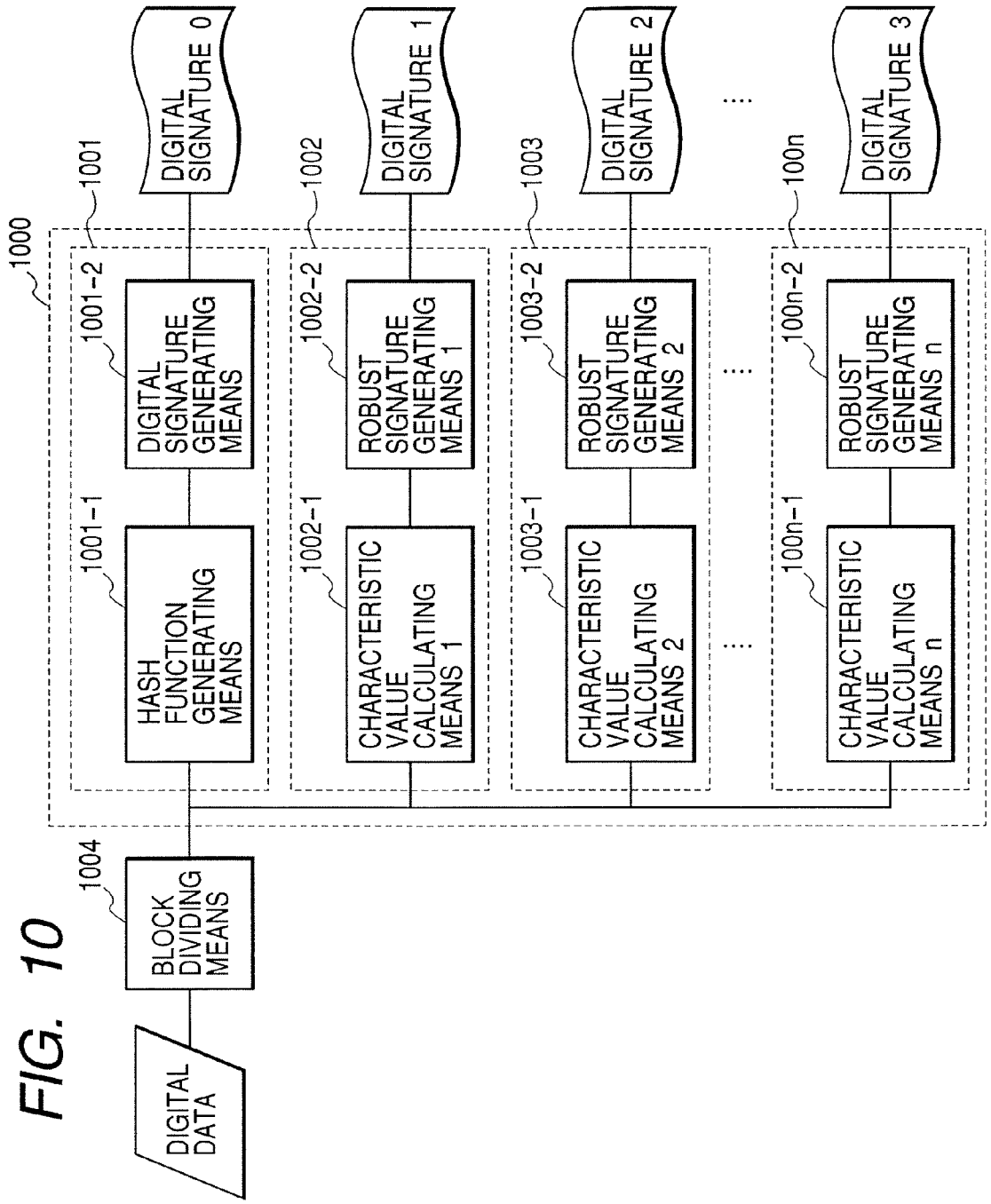
FIG. 10 is a block diagram illustrating an internal process of a multi level robust digital signature adding means.

The multi level robust digital signature adding apparatus will be described with reference to FIG. 10. As different from the robust digital signature adding apparatus shown in FIG. 8, the multi level robust digital signature adding apparatus shown in FIG. 10 generates a plurality of robust digital signatures for one set of block unit image data.

In the multi level robust digital signature adding apparatus, image data is input to a block dividing means 1004 and divided into sets of block unit image data. The block unit image data is input to a digital signature generating means 1000 which is constituted of a digital signature outputting means 1001 and a plurality of robust digital signature outputting means 1002 to 100*n*. The digital signature outputting means 1001 is constituted of a hash function generating means 1001-1 and a digital signature generating means 1001-2. Each of the robust digital signature outputting means 1001 to 100*n* is constituted of a corresponding one of characteristic value calculating means 1002-1 to 100*n*-1 and a corresponding one of robust digital signature generating means 1002-2 to 100*n*-2.

It is assumed that each of the characteristic value calculating means 1002-1 to 100*n*-1 is a means for calculating a different characteristic value. A specific example of calculating a different characteristic value will be detailed hereinunder.

The block unit image data to be input to the digital signature outputting means 1001 and robust digital signature outputting means 1002 to 100*n* may be image data expressed in a spatial region or a coefficient value after image conversion, typically frequency conversion (discrete wavelet conversion (transform) or discrete cosine conversion (transform). The digital signature outputting means 1001 generates a digital signature 0 for the block unit image data by using a hash function and the public-key cryptographic scheme (common-key cryptographic scheme).

In the robust digital signature outputting means 1002 to 100*n*, digital signatures 1 to n for the characteristic value of input block unit image data by using a hash function and the public-key cryptographic scheme (common-key cryptographic scheme).

The digital signature 0 is a digital signature for the whole area of block unit image data. Therefore, there is a high possibility that the digital signature 0 becomes a different digital signature if the block unit image data is slightly changed. The digital signature 0 is therefore effective for checking originality and falsification of image data.

The digital signatures 1 to n are generated in accordance with the characteristic values of block unit image data. Therefore, there is a possibility that the digital signatures 1 to n become the same digital signature if a change in the block unit image data is small.

The digital signatures 0 to n can judge originality and falsification or alteration in accordance with different judgement criteria. By using such digital signatures, the multi level robust digital signature adding apparatus shown in FIG. 10 allows the multi level robust digital signature verifying apparatus to judge originality and falsification or alteration of image data.

In the multi level robust digital signature adding apparatus, digital signature adding means (not shown) adds a plurality of digital signatures to the image data at a predetermined position (a comment column or signature column, a header or the like). In order to identify the position of falsified image data, the digital signature adding means adds the digital signature to the predetermined position of the image data, in correspondence with the position information of each set of block unit image data.

If necessary, information on a characteristic value calculating method and various parameters may be added to the predetermined position of image data.

Next, the multi level robust digital signature verifying apparatus will be described.

The multi level robust digital signature verifying apparatus reads multi level robust digital signature data added to the predetermined position of a digital image data file and verifies the originality and falsification level of digital image data.

Figure 11:
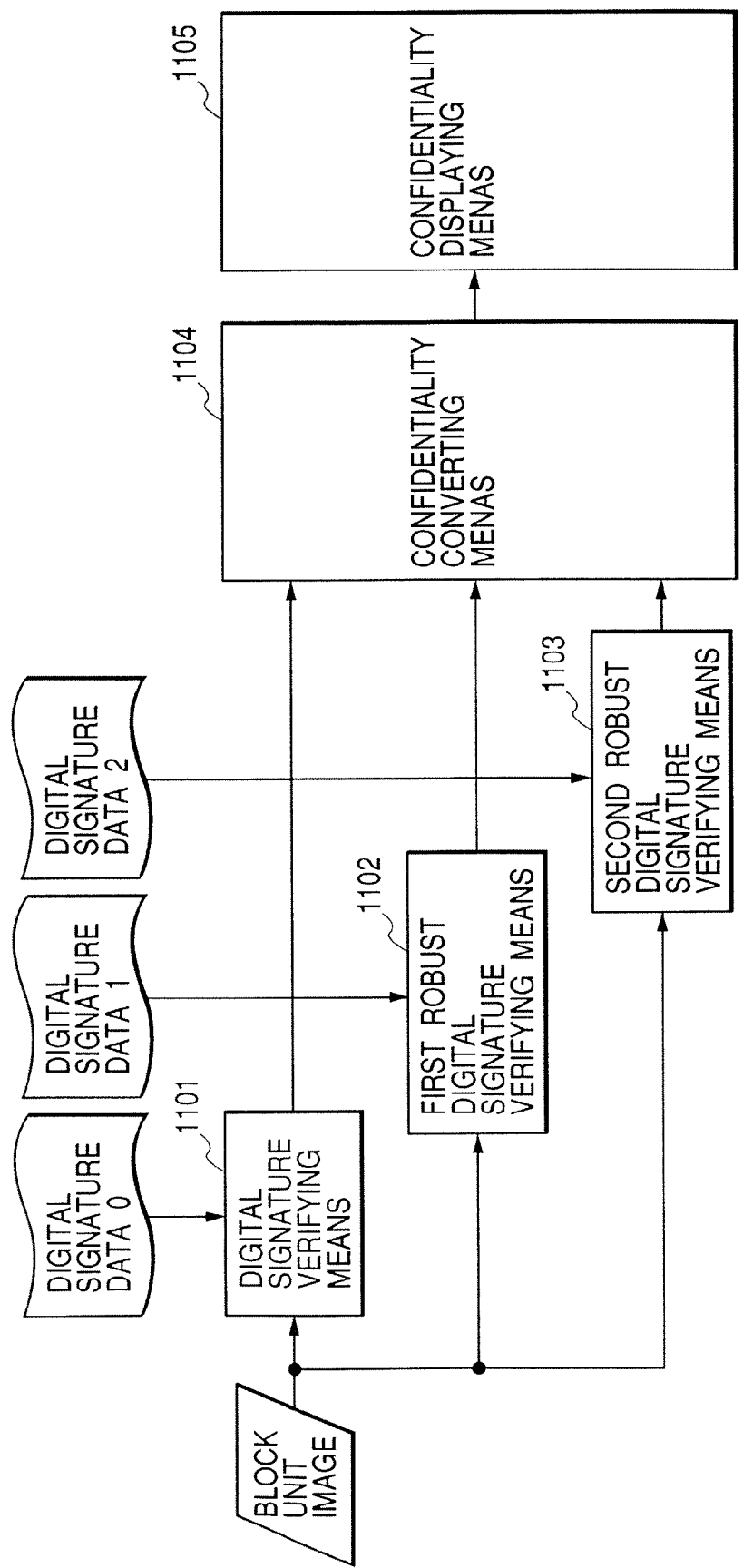
FIG. 11 is a block diagram illustrating an internal process of a multi level robust digital signature verifying means.

FIG. 11 is a block diagram of the multi level robust digital signature verifying apparatus. In FIG. 11, a circuit portion corresponding to only the digital signatures 0 to 2 is drawn for the purposes of simplicity.

First, block unit image data is input to the multi level robust digital signature verifying apparatus. The input block unit image data is supplied to a digital signature verifying means 1101, and first and second robust digital signature verifying means 1102 and 1103.

The digital signatures 0 to 2 derived from the block unit image data at the predetermined position are input to the digital signature verifying means 1101, and first and second robust digital signature verifying means 1102 and 1103. Originality of each set of input block unit image data is verified, and the verification results R0, R1 and R2 are output to a confidentiality converting means 1104.

In accordance with a plurality of input verification results R0 to R2, the confidentiality converting means 1104 calculates the falsification level of each set of input block unit image data or the whole area of image data collected from a plurality set of block unit image data, and outputs the calculated falsification level to a confidentiality displaying means 1105.

The confidentiality displaying means 1105 displays the calculated level on a display, a monitor or the like connected via the network to the multi level robust digital signature verifying apparatus, and notifies it to the verifier of the image data.

Figure 12:
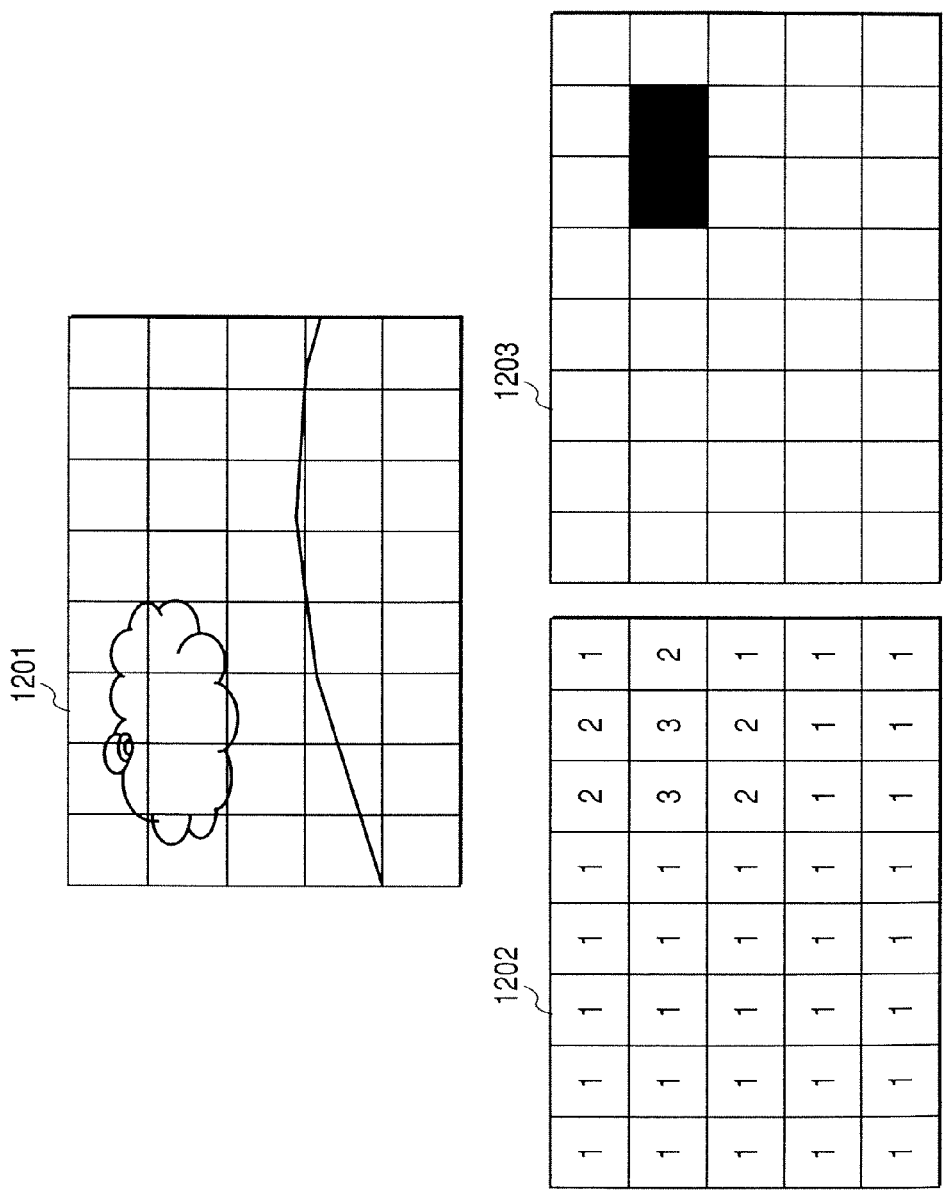
FIG. 12 is a diagram showing an example of a display result by a confidentiality displaying means shown in FIG. 11.

A display example made by the confidentiality displaying means 1105 is shown in FIG. 12.

In FIG. 12, reference numeral 1201 is assumed to represent falsified image data of the image data shown in FIG. 7. The confidentiality displaying means 1105 may display a confidentiality level calculated for each block unit image, as indicated at 1202. The smaller the confidentiality level value, the smaller the falsification so that the originality is high, whereas the larger the confidentiality level value, the larger the falsification so that the originality is low.

Instead of using a numerical value, the originality may be represented visually by using color or pattern as indicated at 1203.

In order to make it easy to find the falsified position, the numerical value 1202 or color 1203 may be displayed superposed upon the verified image data 1201.

Next, the internal process by the robust digital signature outputting means 1002 of the multi level robust digital signature adding apparatus will be described specifically. The other robust digital signature outputting means 1003 to 100*n* operate in a manner similar to the robust digital signature outputting means 1002.

As the image data input machine, an imaging apparatus such as a digital camera and a digital video is used by way of example. Since the data capacity of still images and moving image data is very large, the input machine uses compressed image data. It is therefore necessary that a digital signature can be added and verified also for compressed image data.

In this embodiment, description will be given for the case that a digital signature is added and verified for image data compressed and encoded by JPEG2000 which is one of the standards of still image compression technology.

First, the outline of a compression method of JPEG2000 will be described.

Figure 13:
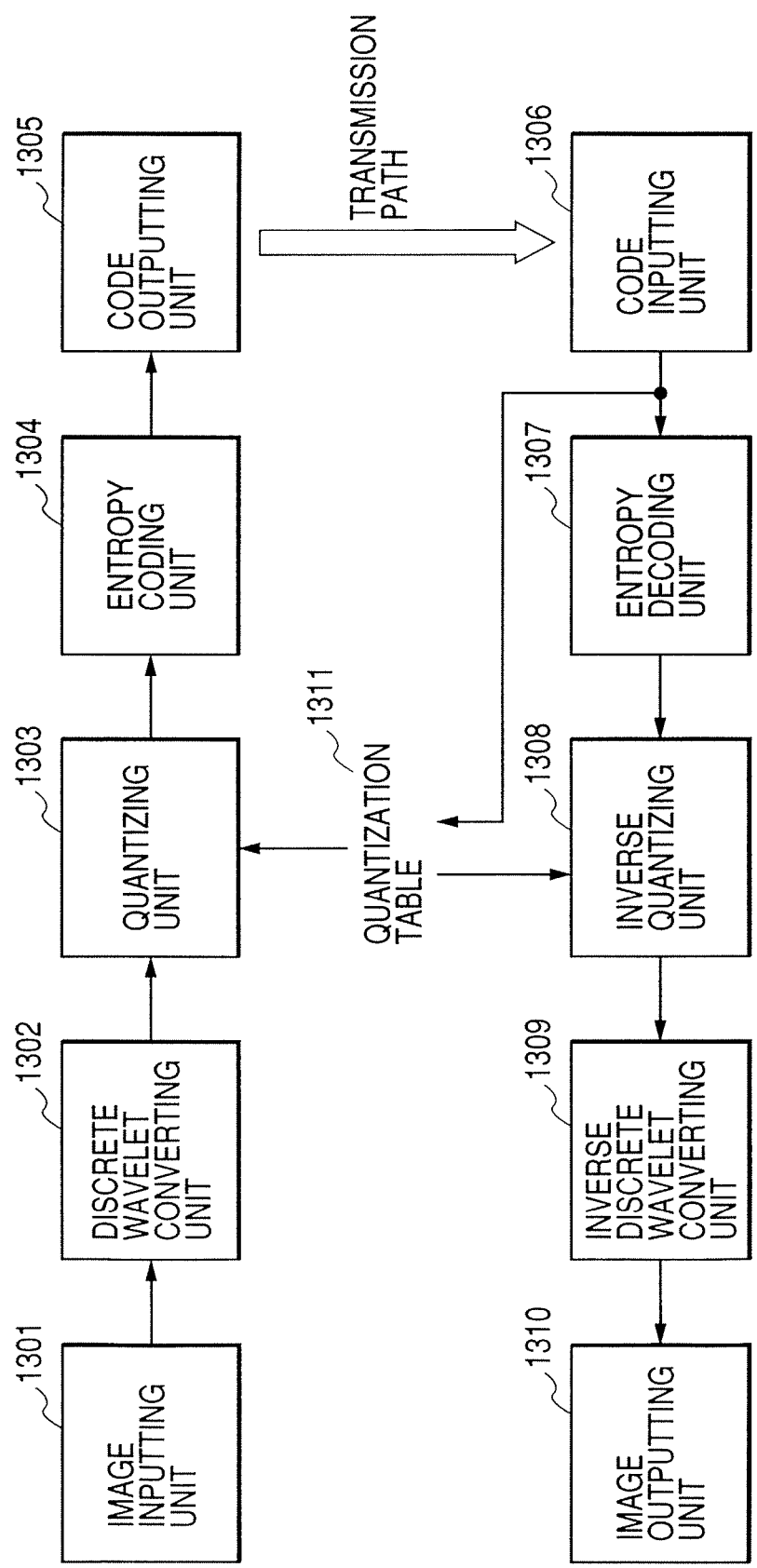
FIG. 13 is a block diagram illustrating an internal process of image compression encoding and image expansion decoding of JPEG 2000.

The upper portion of FIG. 13 is a block diagram of an image encoding apparatus of JPEG2000. Pixel signals constituting an image to be encoded is input to an image inputting unit 1301 in the order of raster scan, and an output of the image input unit is input to a discrete wavelet converting (transforming) unit 1302. The discrete wavelet converting unit 1302 performs a two-dimensional discrete wavelet conversion (transform) process for the input image signal to calculate a conversion coefficient and output it.

The details of the discrete wavelet conversion are well known and the description thereof is omitted.

Figure 14:
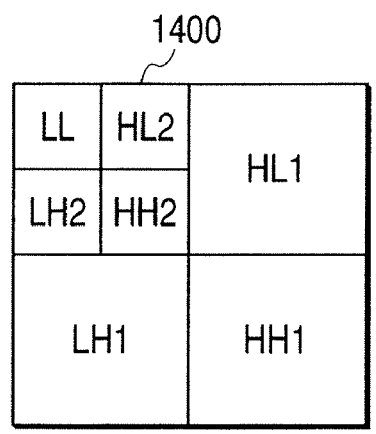
FIG. 14 is a diagram showing a result of discrete wavelet conversion (transform).

FIG. 14 shows an example of the structure of a two-level conversion coefficient group obtained through the two-dimensional conversion process. An image signal is dissolved into coefficient trains HH1, HL1, LH1, . . . , LL in different frequency bands. In the following description, this coefficient group is called a sub-band. The coefficients of each sub-band are output to a succeeding stage quantizing unit 1303.

The quantizing unit 1303 quantizes the input coefficient by a predetermined quantization step and outputs an index of the quantized value.

The quantized index is input from the quantizing unit 1303 to a succeeding stage entropy decoding unit 1304.

The entropy encoding unit 1304 dissolves the input quantized index into bit planes, and performs binary arithmetic encoding in the unit of bit plane to output a code or bit stream. A code outputting unit 1305 can output a code train including the code stream to a code inputting unit 1306 via a transmission line.

Next, a method of decoding the bit stream generated by the image encoding apparatus described above will be described. The lower portion of FIG. 13 is a block diagram showing the structure of the image decoding apparatus. Reference numeral 1306 represents a code inputting unit, reference numeral 1307 represents an entropy decoding unit, reference numeral 1308 represents an inverse quantizing unit, reference numeral 1309 represents an inverse discrete wavelet converting (transforming) unit, and reference numeral 1310 represents an image output unit.

The code inputting unit 1306 is input with a code train, analyzes a header contained in the code train to derive parameters necessary for the succeeding process, and if necessary, controls the process flow or sends corresponding parameters to a succeeding process unit. The bit stream contained in the code train is output to the entropy decoding unit 1307.

The entropy decoding unit 1307 decodes the bit stream in the unit of bit plane and outputs it. The recovered quantized index is output to the inverse quantizing unit 1308.

The inverse quantizing unit 1308 recovers the discrete wavelet conversion coefficients in accordance with the input quantized index and a quantization table 1311 read from the header. The conversion coefficients are output to the succeeding inverse discrete wavelet converting unit 1309.

The inverse discrete wavelet converting unit 1309 executes a two-dimensional inverse discrete wavelet conversion (transform) to recover an original image signal in accordance with the conversion coefficients.

In this case, if the perfect reconfiguration conditions of JPEG2000 are satisfied, the recovered image signal is coincident with an original image signal. The image outputting unit 1310 outputs the recovered image signal.

In this embodiment, in calculating a characteristic value, the characteristic value calculating means 1002-1 of the robust digital signature outputting means 1002 uses the discrete wavelet transform (DWT) coefficients after quantization by compression encoding of JPEG2000. For the purposes of simplification, a reversible filter is used as the DWT filter.

Figure 15:
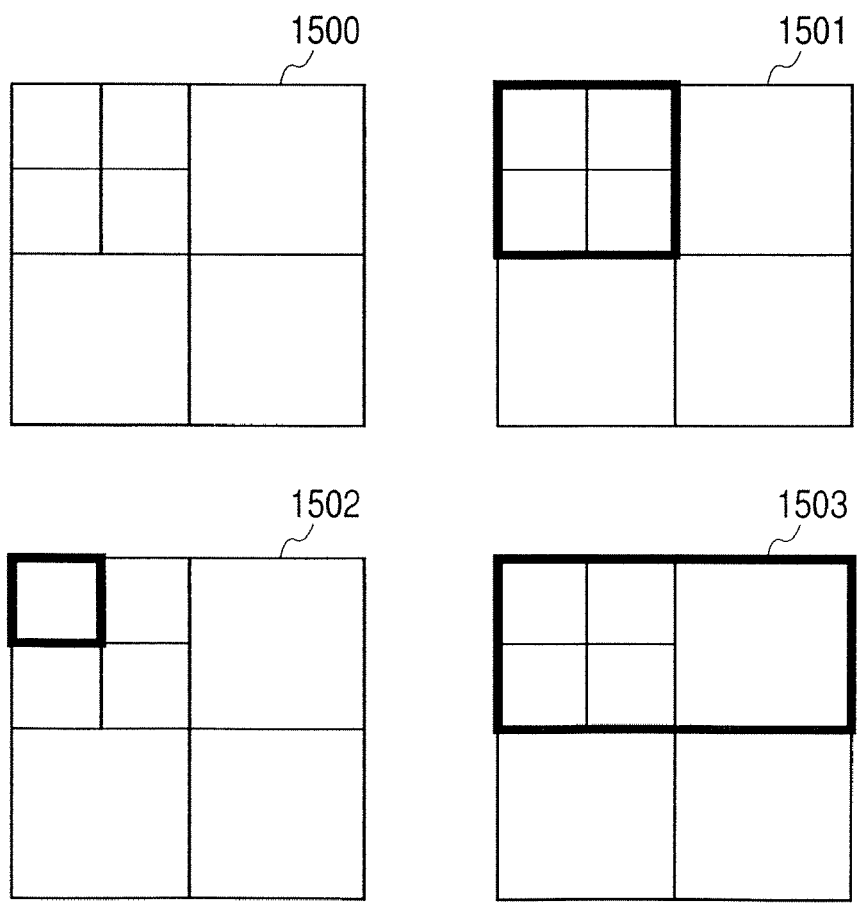
FIG. 15 is a diagram showing an example of a quantization table used by a quantizing unit shown in FIG. 13.

FIG. 15 shows examples of the quantization table used by the quantizing unit 1303. The quantization table 1500 is assumed to be a quantization table used for image data compression before adding a digital signature.

A quantization step for each sub-band is constant in JPEG2000. The coefficient values of the quantization table are omitted in FIG. 15.

The quantization tables 1501 and 1502 are used for realizing middle compression and high compression (low image quality), respectively. The quantization step for the area surrounded by a black frame in the quantization tables 1501 and 1502 is assumed to be the same as the quantization step for the quantization table 1500.

In this embodiment, after the DWT, the characteristic value calculating means 1002-1 of the robust digital signature outputting means 1002 performs quantization by using the predetermined quantization table and derives the quantization DWT coefficients in the predetermined area.

The robust digital signature generating means 1002-2 generates a digital signature from the derived quantization DWT coefficients in the predetermined area.

The predetermined quantization table is a quantization table having a quantization step in a predetermined area same as that of the quantization table used for a compressed image of JPEG2000 for which a digital signature is generated.

The predetermined area is an area (corresponding to an area surrounded with the black frame in FIG. 15) having a quantization step same as that of the quantization table used for a compressed image of JPEG2000 for which a digital signature is generated.

The process by the multi level robust digital signature adding apparatus will be described specifically.

Consider now that the multi level robust digital signature adding apparatus adds multi level robust digital signature data to a JPEG2000 compressed image file A compressed by using the quantization table 1500.

First, the digital signature outputting means 1001 processes all pixel values of a block unit image (or DWT coefficients of a block unit image after quantization) to generate the digital signature 0.

Next, the robust digital signature outputting means 1002 processes the quantized DWT coefficients inside the black frame of the quantization table 1501, among the DWT coefficients of the JPEG2000 compressed image file A after quantization to thereby generate the digital signature 1. The robust digital signature outputting means 1003 processes the quantized DWT coefficients inside the black frame of the quantization table 1502, among the DWT coefficients of the JPEG2000 compressed image file A after quantization to thereby generate the digital signature 2.

The digital signatures 0, 1 and 2 are added to the predetermined position of the image file to thereby obtain an image file A' added with the multi level robust digital signature digital signatures.

Consider next that the image file A' added with the multi level robust digital signature digital signatures is re-compressed again by using the quantization table 1503. This compression does not change the image contents greatly.

The quantization step inside the black frame of the quantization table 1503 is the same as the quantization step in the corresponding area of the quantization table 1500. With this re-compression, an compressed image file A" is generated. It is assumed that the multi level robust digital signatures added to the predetermined position of the image file A' are inherited to the image file A".

The multi level robust digital signature verifying apparatus shown in FIG. 11 verifies the image file A" re-compressed by using the quantization table 1503.

In the digital signature verifying means 1101, the hash value calculated from the block unit image data is different from the hash value calculated from the digital signature read from the file at the predetermined position.

This is because the quantization step in the area of the quantization table used for re-compression and the quantization step in the corresponding area of the quantization table used before re-compression take different values so that the DWT coefficients after quantization change.

In the robust digital signature outputting means 1102, the hash value calculated from the block unit image data and the hash value calculated from the digital signature read from the file at the predetermined position do not change even after re-compression.

This is because the quantization step inside the black frame of the quantization table 1501 and the quantization step in the corresponding area of the quantization table used before re-compression take the same value so that the DWT coefficients after quantization do not change.

In the robust digital signature outputting means 1103, the hash value calculated from the block unit image data and the hash value calculated from the digital signature read from the file at the predetermined position do not change even after re-compression.

This is because the quantization step inside the black frame of the quantization table 1502 and the quantization step in the corresponding area of the quantization table used before re-compression take the same value so that the DWT coefficients after quantization do not change.

Accordingly, the confidentiality converting means 1104 can convert the verification result into a middle degree confidentiality, although not the highest degree confidentiality.

As already described, the confidentiality displaying means 1105 may display the confidentiality level or may present a message such as "although there is a possibility of re-compression, the image contents are not falsified" to the image file verifier.

JPEG2000 can realize the functions of SNR scalability (of holding a high precision image from an image of a rough image quality), spatial scalability (of holding an image of a high resolution from an image of a low resolution), and the like.

Therefore, as will be described hereinunder, not only judging the confidentiality of a re-compressed image but also judging the confidentiality of a reduced image is possible.

Next, judging the confidentiality of a reduced image will be described.

Figure 16:
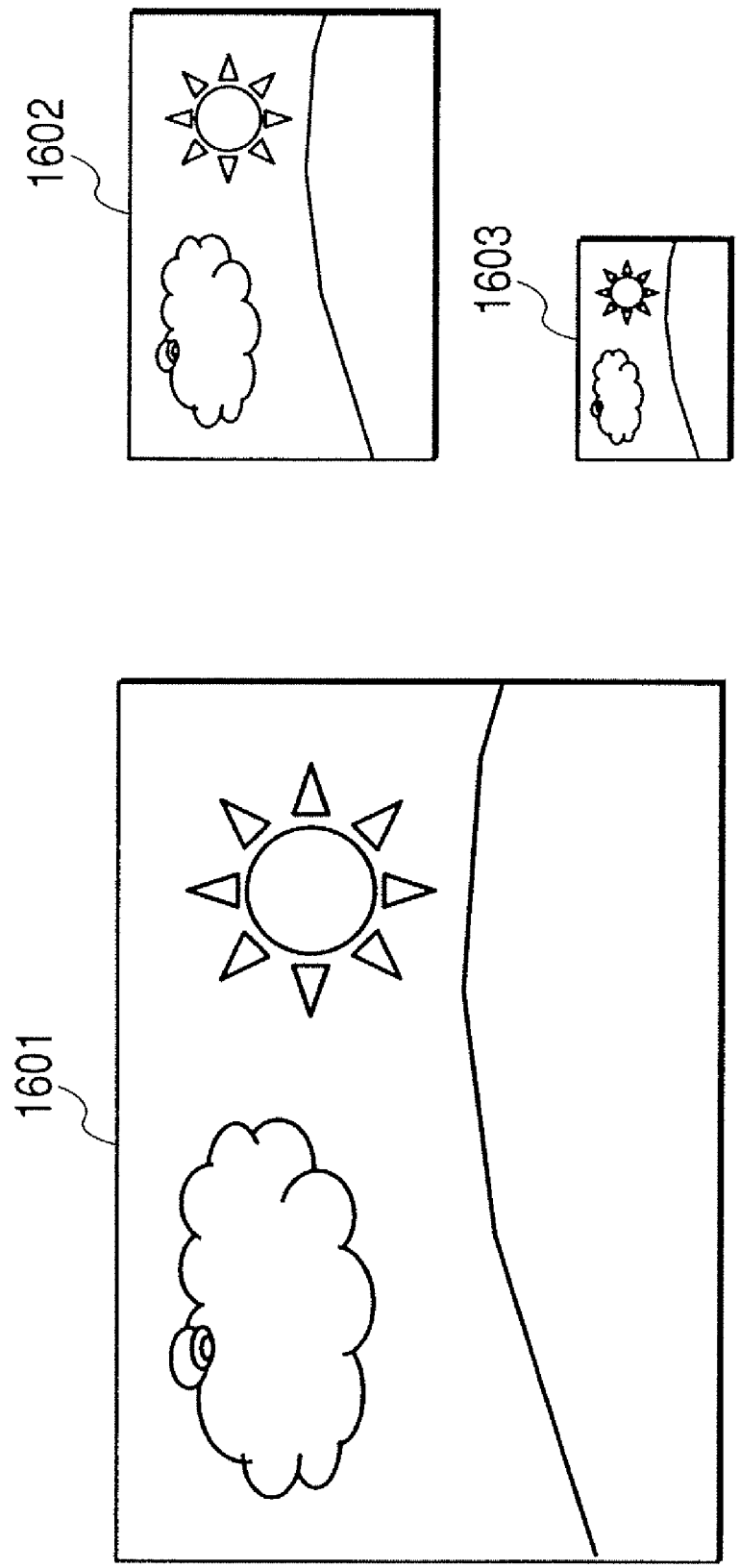
FIG. 16 is a diagram showing spatial scalability of JPEG2000.

If the spatial scalability function of JPEG2000 is utilized, it is known that an original image 1601 shown in FIG. 16 can be recovered from all non-quantized DWT coefficients, a one/fourth reduction image 1602 can be recovered from DWT coefficients inside the black frame shown in the quantization table 1501, and a one/sixteenth reduction image 1603 can be recovered from DWT coefficients inside the black frame shown in the quantization table 1502 (it is necessary to use a reversible discrete wavelet filter, without quantization).

Therefore, if the robust digital signature data is calculated from the DWT coefficients inside the black frame of the quantization table 1501, this digital signature data can be utilized for the confidentiality judgement of the one/fourth reduction image of the image with the signature. Similarly, if the robust digital signature data is calculated from the DWT coefficients inside the black frame of the quantization table 1502, this digital signature data can be utilized for the confidentiality judgement of the one/sixteenth reduction image of the image with the signature.

As described above, by using the robust digital signatures, the confidentiality of reduced digital data can be judged. The verification of originality of digital data can be realized by presenting reduced digital data without presenting original digital data.

It is also possible to add robust digital signatures to JPEG2000 image compressed in a loss-less manner and encoded, and verify the signatures.

In the case of loss-less compression, the quantization table 1500 is a table not performing quantization, and the quantization tables 1501 and 1502 are tables not performing quantization inside the black frames. Also in this case, similar to the above-description, it is obvious that the verification of digital data is possible by using multi level robust digital signatures.

According to JPEG2000, it is possible to perform quantization by cutting off lower bit planes of each sub-band during entropy encoding. The multi level robust digital signature adding and verifying apparatus of this embodiment can deal with quantization during entropy encoding.

For the conversion into a grey scale image, the characteristic value calculating means of the digital signature outputting means may derive only the quantized DWT coefficients of a luminance signal to generate robust digital signature data.

In this embodiment, calculating a digital signature from DWT coefficients after quantization has been described in detail. Instead, if a reversible discrete wavelet filter is used, pixel values before DWT or DWT coefficients after DWT may also be used.

According to JPEG2000, since entropy encoding is performed in the unit of sub-band or bit plane, it is possible to readily derive a reduction image from encoded data. Accordingly, a robust digital signature may be calculated from encoded data after entropy encoding.

As described above, in the embodiment, the confidentiality of image data can be checked stepwise by using a plurality of robust digital signatures based upon the characteristics of image data.

By incorporating the techniques described with the embodiment, the originality of image data can be judged even if the image data is subjected to re-compression, reduction or conversion into grey scale.

A method of generating robust digital signatures from the encoded data after entropy encoding of a JPEG2000 compressed and encoded image will be later described.

Fifth Embodiment

In this embodiment, description will be given for the addition and verification of a digital signature for image data compressed and encoded by JPEG which is one of the standard of image compression technology.

First, the outline of a compression method of JPEG will be described.

Figure 17:
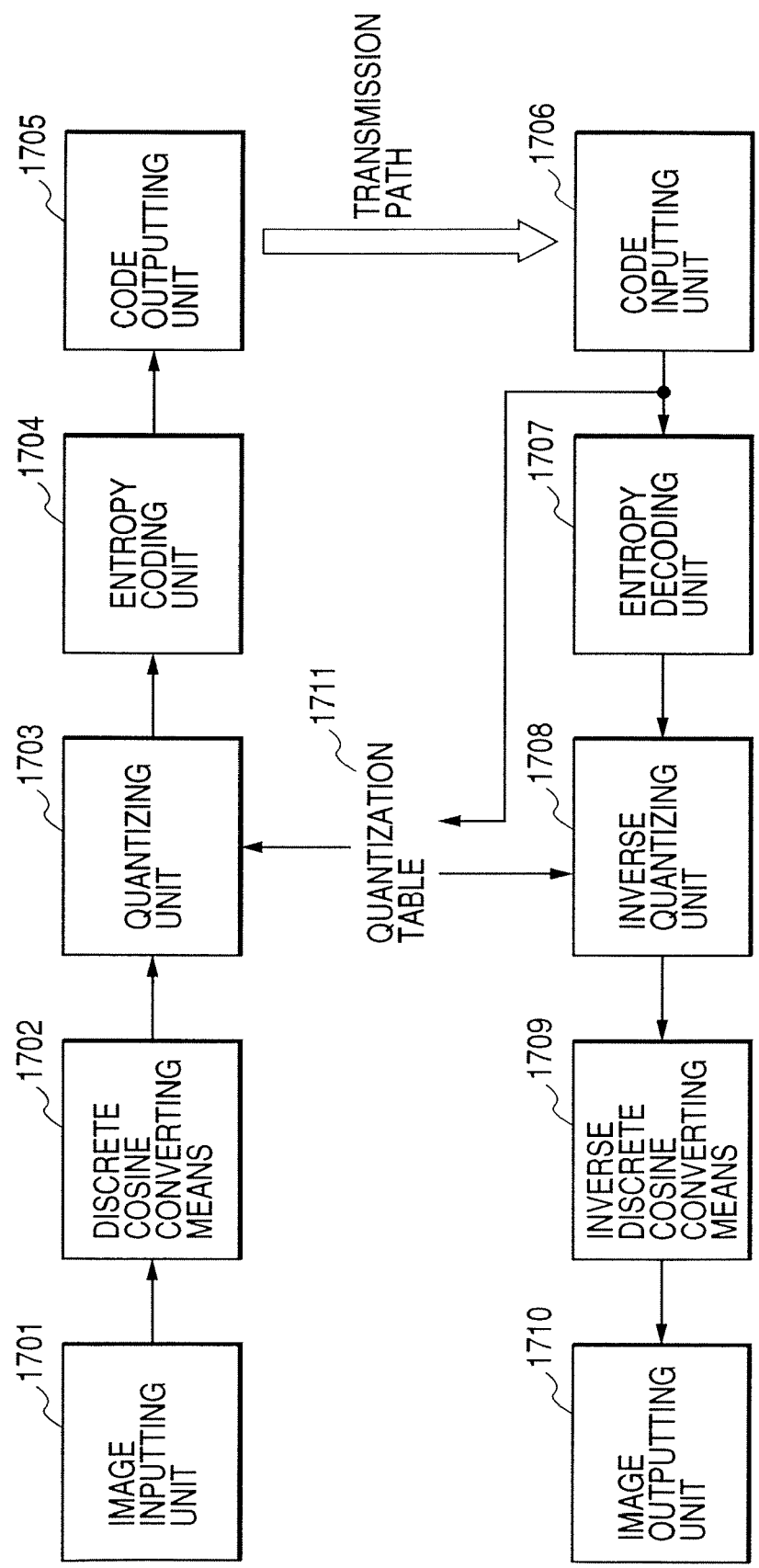
FIG. 17 is a block diagram illustrating an internal process of image compression encoding and image expansion decoding of JPEG.

The upper portion of FIG. 17 is a block diagram of a JPEG image encoding apparatus. Pixel signals constituting an image to be encoded is input to an image inputting unit 1701 sequentially for each minimum encoding unit, and an output of the image input unit is input to a discrete cosine converting (transforming) unit 1702.

The discrete cosine converting unit 1702 performs a two-dimensional discrete cosine conversion (transform) process for the input image signal to calculate a discrete cosine conversion coefficient and output it.

The details of the discrete cosine conversion are well known and the description thereof is omitted.

A quantizing unit 1703 quantizes the input coefficient by using a quantization table and outputs an index of the quantized value. The quantization table is an entity for determining an image quality and a compression factor.

After the DC components of the conversion coefficient input to the quantizing unit 1703 are subtracted, the conversion coefficient is zigzag-scanned and output to an entropy encoding unit 1704.

The entropy encoding unit 1704 encodes the input discrete cosine conversion coefficient by using an encoding table, and outputs a code or bit stream. A code outputting unit 1705 can output a code train including the code stream to a code inputting unit 1706 via a transmission line.

Next, a method of decoding the bit stream generated by the image encoding apparatus described above will be described. The lower portion of FIG. 17 is a block diagram showing the structure of an image decoding apparatus. Reference numeral 1706 represents a code inputting unit, reference numeral 1707 represents an entropy decoding unit, reference numeral 1708 represents an inverse quantizing unit, reference numeral 1709 represents an inverse discrete cosine converting (transforming) unit, and reference numeral 1710 represents an image output unit.

The code inputting unit 1706 is input with a code train, analyzes a header contained in the code train to derive parameters necessary for the succeeding process, and if necessary, controls the process flow or sends corresponding parameters to a succeeding process unit. The bit stream contained in the code train is output to the entropy decoding unit 1707.

The entropy decoding unit 1707 decodes the bit stream and outputs it. The recovered quantized index is output to the inverse quantizing unit 1708.

The inverse quantizing unit 1708 recovers the discrete cosine conversion coefficients in accordance with the input quantized index and a quantization table 1711 read from the header. The conversion coefficients are output to the succeeding inverse discrete cosine converting unit 1709.

The inverse discrete wavelet converting unit 1709 executes a two-dimensional inverse discrete cosine conversion (transform) to recover an original image signal of the minimum encoding unit in accordance with the conversion coefficients.

The above processes are repeated for all minimum encoding units constituting the original image to recover the whole area of the original image. The image output unit 1710 outputs the recovered original image signal.

In the following the discrete cosine conversion (transform) is abbreviated to DCT.

In this embodiment, the block unit image data corresponds to the minimum encoding unit of JPEG compression. In calculating the characteristic value by the characteristic value calculating means 1002-1 of the digital signature outputting means 1002, DCT coefficients after quantization by JPEG compression are used.

Figure 18:
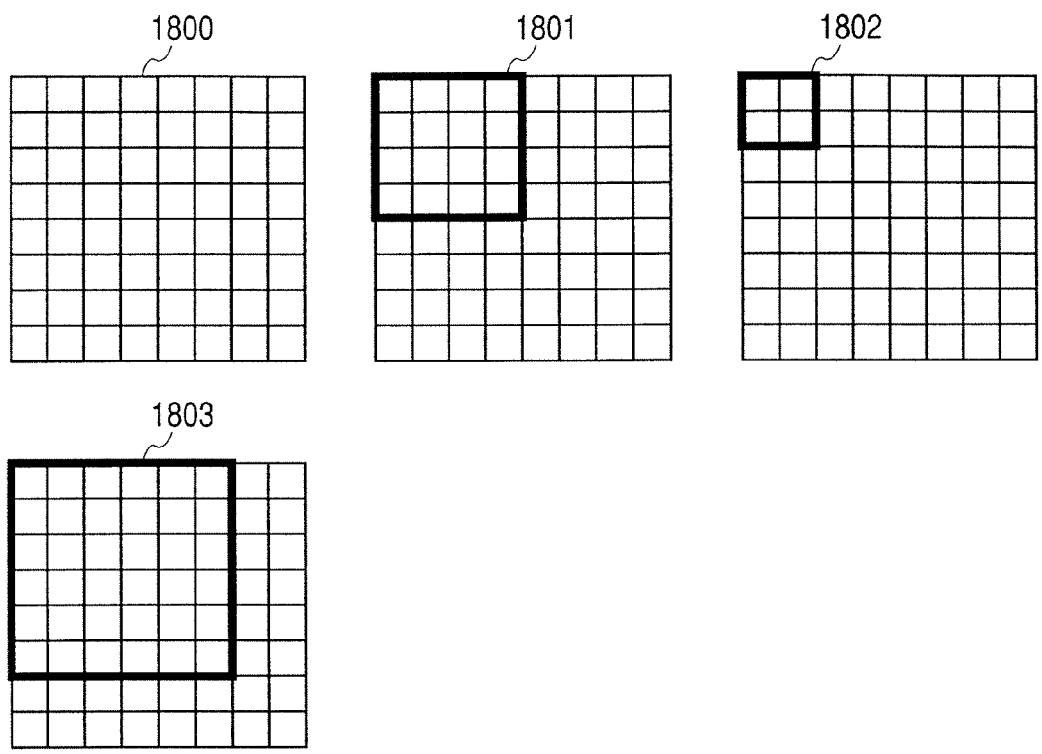
FIG. 18 is a diagram showing an example of a quantization table used by a quantizing unit shown in FIG. 17.
Figure 19:
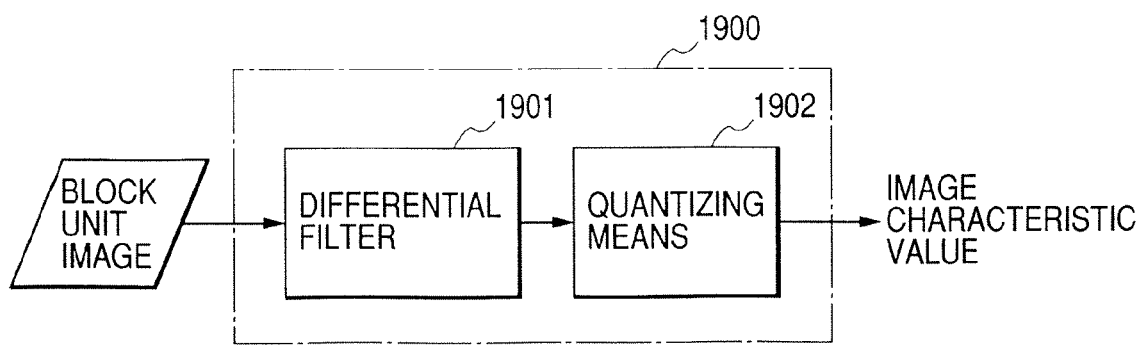
FIG. 19 is a block diagram showing the internal structure of a characteristic value calculating means.

FIG. 18 shows examples of a quantization table used by JPEG compression of this embodiment (coefficient values of the quantization table are omitted).

The quantization table 1800 is used for compressing digital data before a digital signature is added.

The quantization tables 1801 and 1802 are used for realizing middle compression and high compression (low image quality), respectively. The quantization step for the area surrounded by a black frame in the quantization tables 1801 and 1802 is assumed to be the same as the quantization step for the quantization table 1800.

In this embodiment, the characteristic value calculating means 1002-1 of the robust digital signature outputting means 1002 derives DCT coefficients after quantization in a corresponding area of the quantization table having a quantization step in a predetermined area same as that of the quantization table used for a JPEG compression image for which a digital signature is generated. The digital signature generating means 1002-1 processes the DCT coefficients in the predetermined area after quantization to thereby generate a digital signature.

The process by the multi level robust digital signature adding apparatus will be described specifically.

The multi level robust digital signature digital signature generating unit 1000 calculates various digital signatures for a JPEG compression image file B quantized by using the quantization table 1800.

First, the digital signature outputting means 1001 processes spatial block unit image data (or all DCT coefficients of a block unit image during JPEG compression) to generate the digital signature 0.

Next, the robust digital signature outputting means 1002 processes the quantized DCT coefficients inside the black frame of the quantization table 1801, among the DCT coefficients of the JPEG compressed image file B to thereby generate the digital signature 1.

The robust digital signature outputting means 1003 processes the quantized DWT coefficients inside the black frame of the quantization table 1802, among the DCT coefficients of the JPEG compressed image file B to thereby generate the digital signature 2.

The digital signatures 0, 1 and 2 are added to the predetermined position of the image file to thereby obtain an image file B' added with the multi level robust digital signature digital signatures.

Consider next that the image file B' added with the multi level robust digital signature digital signatures is re-compressed again by using the quantization table 1803. This compression does not change the image contents greatly. The quantization step inside the black frame of the quantization table 1803 is the same as the quantization step in the corresponding area of the quantization table 1800.

With this re-compression, a compressed image file B" is generated. It is assumed that the multi level robust digital signatures added to the predetermined position of the image file B' are inherited to the image file B".

The multi level robust digital signature verifying apparatus shown in FIG. 11 verifies the image file B" re-compressed by using the quantization table 1803.

In the digital signature verifying means 1101, the hash value calculated from the block unit image data is different from the hash value calculated from the digital signature read from the file at the predetermined position.

This is because the quantization step in the area of the quantization table used for re-compression and the quantization step in the corresponding area of the quantization table used before re-compression take different values so that the DCT coefficients after quantization change.

In the robust digital signature outputting means 1102, the hash value calculated from the block unit image data and the hash value calculated from the digital signature read from the file at the predetermined position do not change even after re-compression.

This is because the quantization step inside the black frame of the quantization table 1801 and the quantization step in the corresponding area of the quantization table used before re-compression take the same value so that the DCT coefficients after quantization do not change.

In the robust digital signature outputting means 1103, the hash value calculated from the block unit image data and the hash value calculated from the digital signature read from the file at the predetermined position do not change even after re-compression.

This is because the quantization step inside the black frame of the quantization table 1802 and the quantization step in the corresponding area of the quantization table used before re-compression take the same value so that the DCT coefficients after quantization do not change.

Accordingly, the confidentiality converting means 1104 can convert the verification result into a middle degree confidentiality, although not the highest degree confidentiality.

As already described, the confidentiality displaying means 1105 may display the confidentiality level or may present a message such as "although there is a possibility of re-compression, the image contents are not falsified" to the image file verifier.

The points of this embodiment to be paid attention will be described.

DCT is not perfectly reversible in the fundamental JPEG method. DCT coefficients obtained by subjecting a spatial image recovered by reverse DCT of DCT coefficients of a compressed image again to DCT are not therefore always the same as the original DCT coefficients.

Therefore, in the embodiment, it is recommended to incorporate the following two approaches. (1) DCT coefficients before quantization are calculated through reverse quantization of JPEG compressed and encoded data before re-compression, and re-quantized by using a new quantization table to obtain the DCT coefficients after quantization (without using DCT and inverse DCT). (2) Perfectly reversible DCT is used.

This is also applied to the case when an irreversible discrete wavelet filter is used in the first embodiment.

Sixth Embodiment

In the sixth embodiment, the description will be given on the addition and verification of multi robust digital signatures capable of verifying the originality of image data subjected to gamma correction.

The sixth embodiment uses a characteristic value calculating means 1900 shown in FIG. 1 which is used as the characteristic value calculating means 1002-1 of the robust digital signature outputting means 1002.

The characteristic value calculating means 1900 is constituted of a differential filter 1901 and a quantizing means 1902.

First, block unit image data input to the characteristic value calculating means 1900 is processed by the differential filter 1901. The differential filter 1901 is typically a Laplacian filter for calculating a difference from a nearby pixel value. The differential filter 1901 outputs a processed differential image to the quantizing means 1902.

The quantizing means 1902 quantizes the differential image with emphasized edge obtained by the differential filter 1901 to output a characteristic value.

With reference to FIG. 20, the internal process of the robust digital signature outputting means 1002 of the sixth embodiment will be described.

A robust digital signature is calculated for an image 2000. The image 2000 is subjected to gamma correction to obtain an image 2001 from which an image characteristic value can be easily obtained.

A graph 2004 shows the one-dimensional relation between a pixel value and a spatial position of the images 2000 and 2001, respectively indicated by a broken line and a solid line. The graph 2004 shows that the image 2000 has a small change in the pixel values and the image characteristic value is difficult to obtain.

Differential images 2002 and 2003 are obtained from the images 2000 and 2001 subjected to the differential filter 1901. It can be understood that the differential images output from the differential filter 1901 are emphasized at the area where a change in pixel values is large.

A graph 2005 shows the one-dimensional relation between a pixel value and a spatial position of the images 2002 and 2003, respectively indicated by a broken line and a solid line. The differential image 2003 has a larger differential value.

It can be understood that the same quantization data can be obtained by quantizing the graph 2005 by using a proper quantization parameter.

It is therefore possible to generate robust digital signatures for the image 2000, which do not change also with the gamma-corrected image 2001.

When a multi level robust digital signature is generated by using the characteristic value calculating means 1900, similar to the fourth and fifth embodiments, the quantization parameter used by the quantizing means may be changed for each of the robust digital signature outputting means.

With the arrangement described above, it is possible to verify the presence/absence of originality change and falsification of image data from the multi level robust digital signatures, even for a gamma-corrected image.

Seventh Embodiment

In the seventh embodiment, the description will be given on image editing software which performs a working and editing process capable of maintaining the originality of image data added with multi level robust digital signatures.

Figure 21:
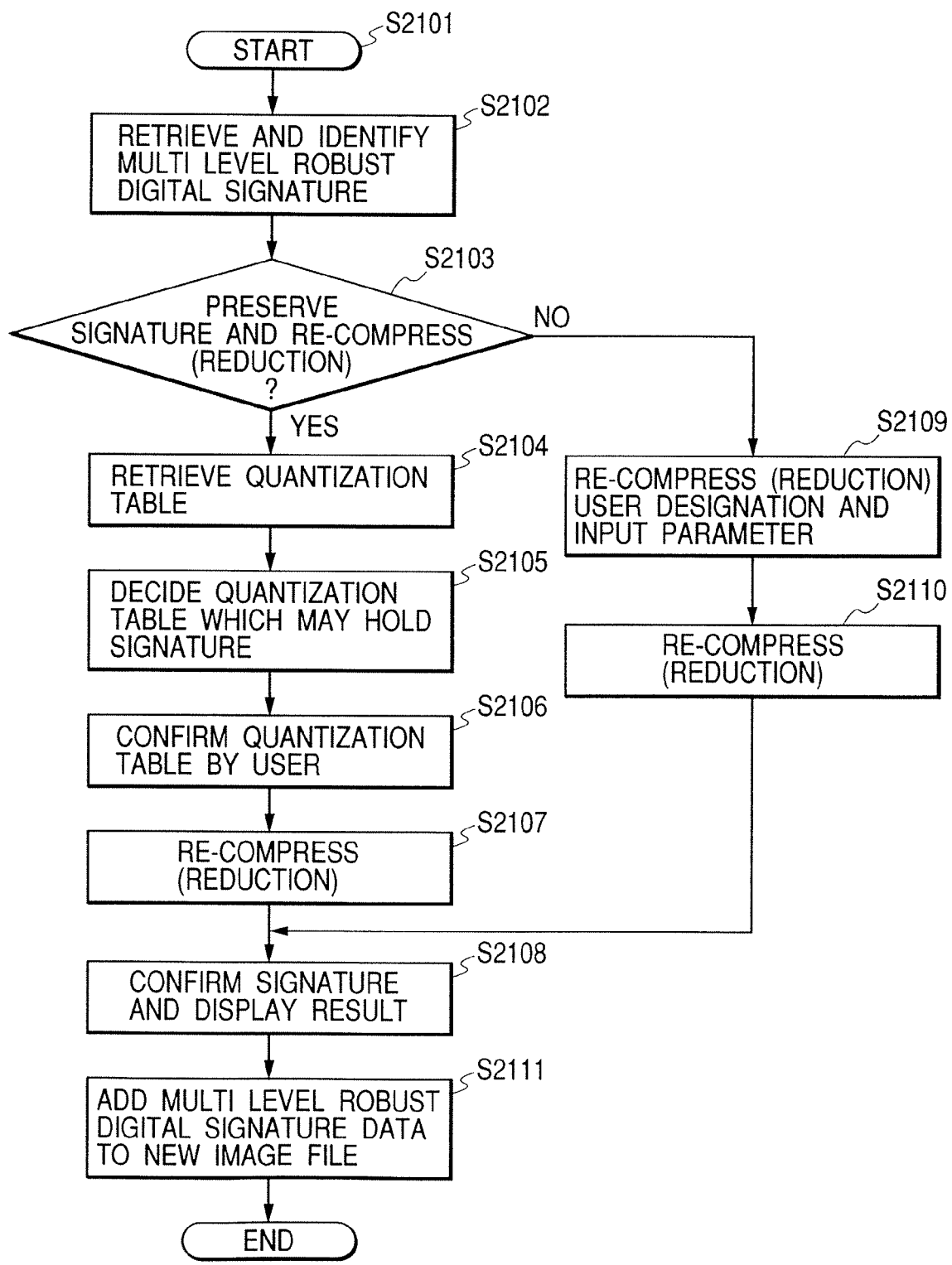
FIG. 21 is a flow chart illustrating a process of image editing software.

FIG. 21 is a flow chart illustrating the operation by an application which performs a working and editing process for a JPEG or JPEG2000 compressed and encoded image with multi level robust digital signatures. In response to an request for a working and editing process from a user, the flow advances to Step S2101 whereat the following process is executed. At Step S2102 it is confirmed whether multi level robust digital signature data exists in an image file at a predetermined position, and the multi level robust digital signature data is retrieved. Next, at Step S2103 a user is asked whether the image working and editing process is performed by maintaining the originality of the image. If the originality is to be maintained, the flow advances to Step S2104 whereat a quantization table is read from a predetermined position of the image file. In this case, another quantization table to be used for generating a robust digital signature is also read.

In order to re-compress (reduce) a compressed and encoded image with multi level robust digital signatures while maintaining the signatures, it is necessary to know the range in which the signatures do not change.

At Step S2105 the application decides the quantization table which may hold the signatures.

At Step S2106 the user is asked to confirm the decided quantization table which may hold the signatures.

At Step S2107 the image is re-compressed (reduced) in accordance with the decided quantization table. Thereafter, the flow advances to Step S2108.

If the originality of the digital signatures is not maintained at Step S2103, the flow advances to Step S2109 whereat a parameter designated by the user is input. The flow advances to Step S2110 whereat the image is re-compressed (reduced) by using the parameter designated by the user.

At Step S2108 the digital signature is confirmed, the maintenance of the multi level robust digital signatures is verified, and the verification result is displayed.

Lastly, at Step S2111 the multi level robust digital signatures are added to the predetermined position of the new image file.

There are several methods of adding multi level robust digital signature data at Step S2111.

For example, if an image file is to be re-compressed, the multi level robust digital signature data itself before re-compression is inherited to the predetermined position of the image file after re-compression.

In this case, it is possible to judge the confidentiality level by maximizing the characteristics of multi level robust digital signature data.

If the image editing software of the embodiment is used to obtain reduced images 1602 and 1603 shown in FIG. 16, only the multi level robust digital signature data corresponding to the reduced image, among the multi level robust digital signature data, may be inherited to the predetermined position of the edited image file, or the multi level robust digital signature data corresponding to the reduced image and the multi level robust digital signature data corresponding to further reduced images may be inherited.

In this case, although the confidentiality level cannot be judged stepwise, it is sufficient for confirming the verification of the originality of reduced image data, and it can be considered that it is not necessary to inherit all multi level robust digital signature data before image editing.

The image editing software of the embodiment may have a function of inserting a comment or flag indicating that the image was changed while maintaining the digital signatures, or change contents, into the predetermined position of the changed digital image file with multi level robust digital signatures.

A comment may be an address (URL or the like) on the network where the multi level robust digital signatures before image change.

The comment is effective for explicitly notifying the verifier of the existence of multi level robust digital signature data before change. If necessary, the verifier can acquire image data with high precision multi level robust digital signatures or the like.

Eighth Embodiment

In the fourth embodiment, robust digital signature data is generated by inputting DWT coefficients after quantization of a JPEG2000 compressed and encoded image. The detail description of the eighth embodiment will be given on the generation of a robust digital signature by inputting encoded data of a JPEG2000 compressed and encoded image.

FIGS. 22A to 22D are schematic diagrams showing the structure of a code train without space scalable/ROI of JPEG2000. FIG. 22A shows the whole structure of a code train. MH represents a main header, TH represents a time header, and BS represents a bit stream. As shown in FIG. 22B, the main header MH is constituted of: the size (horizontal and vertical pixel numbers) of an image to be encoded; the size of each of a plurality of rectangular tiles obtained by dividing the image; the number of components representative or each color, the size of each component; and component information representative of a bit precision.

The structure of the tile header TH is shown in FIG. 22C. The tile header TH is constituted of a tile length representative of the sum of a bit stream length of the tile and a header length, and an encoding parameter for the tile. The encoding parameter includes the level of discrete wavelet conversion, the type of a filter and the like.

The structure of the bit stream is shown in FIG. 22D. The bit stream is constituted of sub-bands sequentially disposed from the sub-band having a smallest resolution toward the sub-band having a higher resolution. In each sub-band, codes are disposed in the unit of bit plane from the highest level bit plane toward the lower level bit plane. With this code arrangement, hierarchical decoding with a spatially increasing resolution becomes possible.

The bit stream is constituted of a packet unit in practice. A packet is a collection of coding paths classified by each precinct at each sub-band level in each layer for each color. The bit stream (time encoded data) is constituted of such a packet unit.

A code block, and the coding path, layer and precinct will be briefly described. The code block is the encoding unit obtained by dividing each sub-band in rectangles. The coding path is the unit used when a bit plane is subjected to entropy encoding (binary arithmetic encoding). The layer is a collection of coding paths belonging to one or more code blocks and crossing sub-bands. The precinct is a collection of data holding the same area of an original image. The compression and encoding method of JPEG2000 is already well known and the detailed description thereof is omitted.

In the case of JPEG2000 compressed and encoded data, the packet data area corresponding to LL, HH2 and HH1 of the data subjected to entropy encoding can be identified by checking the packet headers which describe the sizes of packets in the main header, title header and the like. Therefore, if the digital signature data for the LL encoded data, LL to HH2 encoded data and LL to HH1 encoded data in the bit stream of each tile is given, the multi level robust digital signatures of a 1/16 reduction image, a 1/4 reduction image and a full size image can be generated at high speed.

If an entropy encoding method is changed, there is the demerit that it is judged as falsification, because the robust digital signature changes although the image contents are not changed. However, there is the merit that a digital camera and a digital video camera having a CPU performance inferior to PC can generate multi level digital signature data at high speed.

The generated multi level robust digital signature data is added to the predetermined position of a file, along with the information on the corresponding tile position, sub-band and the like.

In this embodiment, coding data is arranged spatially scalable. Similarly, multi level robust digital signature data can be generated for coding data arranged SNR scalable or the like.

Multi level robust digital signature data can be generated not only for reduction images but also for luminances of reduction images, by maximizing the characteristics of JPEG2000 compressed and encoded data.

Multi level robust digital signature data for a 1/16 reduction image, a 1/4 reduction image and a full size image can be generated by analyzing the packet header if encoding data is arranged SNR scalable, or the multi level robust digital signature data can be recovered.

In the first to eighth embodiments, the description is given for the addition and verification of digital signature for digital image data. The embodiments not limited only thereto.

Moving image data can be considered to be constituted of two-dimensional image data collected relative to the time axis direction. Therefore, the principles of the first to eighth embodiments are applicable.

The principles of the embodiments are also applicable to voice data by replacing the process of two-dimensional image data with the one-dimensional process.

In the first to eighth embodiments, the generation and addition of a digital signature may be performed by a dedicated hardware circuit or the computer function similar to the image processing apparatus shown in FIG. 1, provided in the input machine 114. In this case, the digital signature can be generated immediately after the image contents are picked up so that the originality can be improved.

The first to eighth embodiments may be applied to a system having a plurality of apparatuses (e.g., a host computer, an interface apparatus, a reader, a printer and the like) or to a single apparatus (e.g., a copier, a facsimile or the like).

It is obvious that the objects of the invention can be achieved by supplying the system or apparatus with a storage medium storing software program codes realizing the function of the host and a terminal of the first to eighth embodiments and by making a computer (CPU or MPU) of the system or apparatus read the program codes stored in the storage medium and execute them. In this case, the software program codes themselves read from the storage medium realize the functions of the first to eighth embodiments. Therefore, the program codes themselves and the storage medium storing the program codes constitute the present invention.

The storage medium for storing such program codes may be a ROM, a flexible disk, a hard disk, an optical disk, a magneto optical disk, a CD-ROM, a CD-R, a magnetic tape, a nonvolatile memory card or the like.

It is obvious that the functions of the first to eighth embodiments can be realized not only by making a computer execute the read program codes but also by making an OS or the like running on a computer perform a portion of the whole of the actual processes in accordance with the instructions of the program codes. It is obvious that the functions of the first to eighth embodiments can be realized by writing the program codes read from the storage medium into a memory of a function expansion board inserted into a computer or of a function expansion unit connected to the computer, and thereafter by making a CPU or the like of the function expansion board or unit execute a portion or the whole of actual processes.

The invention claimed is:

1. A digital data providing apparatus comprising:
an inputting unit that inputs digital image data;
a processing unit that performs a JPEG compression process or a tonal level conversion process on the digital image data;
a calculating unit that calculates an index value for the processed digital image data, wherein the index value is one of a Signal to Notice Rate (SNR), a Peak Signal to Notice Rate (PSNR), a Perceptive Evaluation Level (PEL), and a Just Noticeable Difference (JND);
a judging unit that judges whether or not the process performed on the digital image data by the processing unit involves falsification, by comparing the index value calculated by the calculating unit with a predetermined value;
a signature generating unit that generates a digital signature from the digital image data input by the inputting unit, if it is judged by the judging unit that the process performed on the digital image data by the processing unit does not involve falsification, and does not generate the digital signature if it is judged that the process involves falsification, wherein the digital signature is generated by
(a) sequentially comparing bit planes of the digital image data inputted by the inputting unit with bit planes of the processed digital image data, from the bit plane near the most significant bit (MSB) toward the bit plane near the least significant bit (LSB), and using the bit planes having the same values to generate the digital signature, or
(b) sequentially comparing frequency components converted from the digital image data inputted by the inputting unit with frequency components converted from the processed digital image data, from the high frequency components toward the low frequency components, and using the components having the same values to generate the digital signature; and
an outputting unit that outputs the digital image data processed by the processing unit and the digital signature generated by the signature generating unit,
wherein at least the processing unit, the calculating unit, and the signature generating unit are implemented by a CPU in the digital data providing apparatus.

2. A digital data providing method comprising:
an inputting step of inputting digital image data into a digital data providing apparatus;
a processing step of performing a JPEG compression process or a tonal level conversion process on the digital image data;
a calculating step of calculating an index value for the processed digital image data, wherein the index value is one of a Signal to Notice Rate (SNR), a Peak Signal to Notice Rate (PSNR), a Perceptive Evaluation Level (PEL), and a Just Noticeable Difference (JND);
a judging step of judging whether or not the process performed on the digital image data in the processing step involves falsification, by comparing the index value calculated in the calculating step to a predetermined value;
a signature generating step of generating a digital signature from the digital image data input in the inputting step, if it is judged in the judging step that the process performed on the digital image data in the processing step does not involve falsification, and not generating the digital signature if it is judged that the process involves falsification, wherein the digital signature is generated by
(a) sequentially comparing bit planes of the digital image data inputted by the inputting unit with bit planes of the processed digital image data, from the bit plane near the most significant bit (MSB) toward the bit plane near the least significant bit (LSB), and using the bit planes having the same values to generate the digital signature, or
(b) sequentially comparing frequency components converted from the digital image data inputted by the inputting unit with frequency components converted from the processed digital image data, from the high frequency components toward the low frequency components, and using the components having the same values to generate the digital signature; and
outputting the digital image data processed in the processing step and the digital signature generated in the generating step,
wherein at least the processing step, the calculating step, and the signature generating step are implemented by a CPU in the digital data providing apparatus.

3. A non-transitory computer-readable medium embodying a program for a digital data providing method comprising:
an inputting step of inputting digital image data;
a processing step of performing a JPEG compression process or a tonal level conversion process on the digital image data;
a calculating step of calculating an index value for the processed digital image data, wherein the index value is one of a Signal to Notice Rate (SNR), a Peak Signal to Notice Rate (PSNR), a Perceptive Evaluation Level (PEL), and a Just Noticeable Difference (JND);
a judging step of judging whether or not the process performed on the digital image data in the processing step involves falsification, by comparing the index value calculated in the calculating step with a predetermined value;
a signature generating step of generating a digital signature if it is judged in the judging step that the process performed on the digital image data in the processing step does not involve falsification, and not generating the digital signature if it is judged that the process involves falsification, wherein the digital signature is generated by
(a) sequentially comparing bit planes of the digital image data inputted by the inputting unit with bit planes of the processed digital image data, from the bit plane near the most significant bit (MSB) toward the bit plane near the least significant bit (LSB), and using the bit planes having the same values to generate the digital signature, or
(b) sequentially comparing frequency components converted from the digital image data inputted by the inputting unit with frequency components converted from the processed digital image data, from the high frequency components toward the low frequency components, and using the components having the same values to generate the digital signature; and
outputting the digital image data processed in the processing step and the digital signature generated in the generating step.

* * * * *